(12) United States Patent
Watson et al.

(10) Patent No.: US 10,768,835 B1
(45) Date of Patent: Sep. 8, 2020

(54) OPPORTUNISTIC STORAGE SERVICE

(71) Applicant: Amazon Technologies, Inc., Seattle, WA (US)

(72) Inventors: Christopher Nathan Watson, Seattle, WA (US); Leonid Baryudin, San Jose, CA (US); Tyler Huston Doornenbal, Bothell, WA (US); Truong Nguyen, Los Altos, CA (US); Phillip Peterson, Seattle, WA (US); Wenzhou Chen, Cupertino, CA (US); Christopher J. Douglass, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 16/020,755

(22) Filed: Jun. 27, 2018

(51) Int. Cl.
*G06F 3/06* (2006.01)
*G06F 9/50* (2006.01)
*H04L 12/24* (2006.01)
*G06F 9/455* (2018.01)

(52) U.S. Cl.
CPC ............ *G06F 3/0631* (2013.01); *G06F 3/067* (2013.01); *G06F 3/0608* (2013.01); *G06F 3/0614* (2013.01); *G06F 3/0644* (2013.01); *G06F 3/0665* (2013.01); *G06F 9/45558* (2013.01); *G06F 9/5077* (2013.01); *H04L 41/0806* (2013.01); *G06F 2009/45583* (2013.01)

(58) Field of Classification Search
CPC ...... G06F 3/0631; G06F 3/0665; G06F 3/067; G06F 3/0614; G06F 9/5077; G06F 3/0644; G06F 9/45558; G06F 3/0608; G06F 2009/45583; H04L 41/0806

USPC ....................................................... 711/170
See application file for complete search history.

(56) References Cited

U.S. PATENT DOCUMENTS

| 5,574,878 A | 11/1996 | Onodera et al. |
| 6,463,509 B1 | 10/2002 | Teoman et al. |
| 7,788,664 B1 | 8/2010 | Janakiraman et al. |

(Continued)

FOREIGN PATENT DOCUMENTS

WO    2011/088261    7/2011

OTHER PUBLICATIONS

"Amazon EBS API and Command Overview", downloaded Jul. 11, 2013 from doc.aws.amazon.com/AWSEC2/latest/UserGuide/ebs-api-cli-overview.html, p. 1.

(Continued)

*Primary Examiner* — David Yi
*Assistant Examiner* — Zubair Ahmed
(74) *Attorney, Agent, or Firm* — Robert C. Kowert; Kowert, Hood, Munyon, Rankin & Goetzel, P.C.

(57) ABSTRACT

An opportunistic storage service, or system, identifies currently unused storage capacity on a plurality of physical storage components of computing devices dispersed throughout a provider network. In some embodiments, the currently unused storage capacity is provisioned as primary storage, but is not currently being used to store primary storage data. The opportunistic storage service advertises at least a portion of the currently unused storage capacity as opportunistic storage capacity and provisions the opportunistic storage capacity subject to revocation if additional storage capacity of the physical storage components is needed to store primary storage data to fulfill a primary storage commitment.

22 Claims, 13 Drawing Sheets

(56) References Cited

U.S. PATENT DOCUMENTS

| | | | |
|---|---|---|---|
| 7,895,261 | B2 | 2/2011 | Jones et al. |
| 8,280,853 | B1 | 10/2012 | Lai et al. |
| 8,285,687 | B2 | 10/2012 | Voll et al. |
| 8,688,660 | B1 | 4/2014 | Sivasubramanian |
| 9,110,600 | B1 | 8/2015 | Brooker |
| 9,246,996 | B1 | 1/2016 | Brooker |
| 9,503,517 | B1* | 11/2016 | Brooker .............. H04L 67/1008 |
| 9,563,385 | B1 | 2/2017 | Kowalski et al. |
| 2002/0059253 | A1 | 5/2002 | Albazz et al. |
| 2003/0191930 | A1 | 10/2003 | Viljoen et al. |
| 2004/0078419 | A1 | 4/2004 | Ferrari et al. |
| 2008/0140905 | A1 | 6/2008 | Okuyama |
| 2009/0228889 | A1 | 9/2009 | Yoshida |
| 2009/0249470 | A1 | 10/2009 | Litvin et al. |
| 2010/0037009 | A1 | 2/2010 | Yano et al. |
| 2010/0070725 | A1 | 3/2010 | Prahlad et al. |
| 2010/0191922 | A1 | 7/2010 | Dickey et al. |
| 2010/0312983 | A1 | 12/2010 | Moon et al. |
| 2012/0079221 | A1 | 3/2012 | Sivasubramanian et al. |
| 2012/0254687 | A1 | 10/2012 | Leggette et al. |
| 2013/0007753 | A1 | 1/2013 | Jain |
| 2013/0046966 | A1 | 2/2013 | Chu et al. |
| 2013/0067187 | A1* | 3/2013 | Moss .................... G06F 3/0689 711/170 |
| 2013/0086270 | A1* | 4/2013 | Nishikawa ............ G06F 9/5011 709/226 |
| 2013/0086585 | A1 | 4/2013 | Huang et al. |
| 2013/0104126 | A1 | 4/2013 | Padmanabhuni et al. |
| 2013/0198459 | A1 | 8/2013 | Joshi et al. |
| 2014/0181046 | A1 | 6/2014 | Pawar et al. |
| 2016/0274814 | A1* | 9/2016 | Zhang ................. G06F 9/45558 |
| 2018/0004769 | A1* | 1/2018 | Markiewicz .......... G06F 3/0685 |

OTHER PUBLICATIONS

"AMI Basics" downloaded Jul. 11, 2013 from doc.aws.amazon.com/AWSEC2/latest/UserGuide/ComponentsAMIs.html, p. 1-2.
"AWS Amazon Elastic Block Store (EBS)—Persistent Storage" downloaded Jul. 11, 2013 from aws.amazon.com/ebs/, pp. 1-4.
"Cloudiquity" Published Mar. 12, 2009, Amazon Web Services and Cloud, pp. 1-4.
"Feature Guide: Elastic Block Store: Articles & Tutorials: Amazon Web Services" downloaded Jul. 11, 2013 from aws.amazon.com/articles/1667, pp. 1-7.
VMware; Carl Waldspurger; Memory Resource Management in WMware ESX Server; pp. 1-24, Dec. 10, 2002.
HP; Chris Hyser et al.; Autonomic Virtual Machine Placement in the Data Center; pp. 1-10, Feb. 26, 2008; HP Laboratories.
SwinBrain. "Database Management System Introduction". Nov. 17, 2009. Also available at http://swinbrain.ict.swin.edu.au/wiki/Database_Management_Systems_Introduction.
Amazon S3 Storage Services Guide—Developer Guide (API Version Mar. 1, 2006 ). Can be accessed at <http://docs.aws.amazon.com/AmazonS3/latest/dev/Welcome.html>.
Reich et al. "VMTorrent: Scalable P2P Virtual Machine Streaming". Dec. 10-13, 2012.
U.S. Appl. No. 15/425,857, filed Feb. 6, 2017, Marcin Piotr Kowalski et al.
U.S. Appl. No. 12/892,742, filed Sep. 28, 2010, Swaminathan Sivasubramanian et al.
U.S. Appl. No. 12/892,735, filed Sep. 28, 2010, Swaminathan Sivasubramanian et al.
U.S. Appl. No. 14/205,067, filed Mar. 11, 2014, Danny Wei et al.
U.S. Appl. No. 14/204,992, filed Mar. 11, 2014, Danny Wei et al.
U.S. Appl. No. 14/625,535, filed Feb. 18, 2015, Surya Prakash Dhoolam et al.
Flashdba "Understanding Flash: Blocks, Pages and Program/Erases" Oracle databases, storage and the high-performance world of flash memory, dated Jun. 20, 2014, pp. 1-5.
Flashdba "Understanding Flash: The Flash Translation Layer" Oracle databases, storage and the high-performance world of flash memory, dated Sep. 17, 2014, pp. 1-5.

* cited by examiner

| Primary Storage SLA 302 | |
|---|---|
| Storage Availability | Available on demand without restriction |
| Transaction Rate | Guaranteed up to 100,000/sec |
| Duration | Indefinite |
| Cost | Standard |
| ⋮ | |

FIG. 3A

| Opportunistic Storage SLA 352 | |
|---|---|
| Storage Availability | Opportunistic, not guaranteed to be available |
| Transaction Rate | Opportunistic subject to throttling / blocking |
| Duration | Subject to short-notice revocation |
| Cost | Low |
| ⋮ | |

FIG. 3B

OPPORTUNISTIC STORAGE SERVICE

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage resources through the advent of virtualization has enabled consumers of processing resources and storage resources to flexibly structure their computing and storage costs in response to immediately perceived computing and storage needs.

Virtualized computing environments are frequently supported by block-based storage, object-based storage, database services, and/or other virtual storage services. In some situations, virtual storage resources may be able to interact with various computing resources through a series of standardized storage calls. The standardized storage calls may render the computing resources agnostic to structural and functional details of the physical storage devices that implement the virtual storage resources.

In some systems, such virtualized storage resources may be implemented using remote physical storage devices that are connected over a network to computing resources for which they provide storage availability. In such systems, transaction volumes and transaction latencies for transactions between the computing resources and virtualized storage resources may be limited due to delays and limitations associated with transmitting data between the computing resources and the remote storage devices, or may be limited for other reasons. In other systems, physical storage devices and physical computing devices may be located local to one another and may be offered to clients as integrated compute and storage virtualizations. In such arrangements, capacities of the local physical storage devices may be reserved for use by computing virtualizations implemented using associated local computing devices. In such arrangements, a significant portion of the storage capacities of the local storage devices may be unutilized to store data when exclusively reserved for one or more local compute instances.

BRIEF DESCRIPTION OF THE DRAWINGS

FIG. 3A illustrates portions of an example service level agreement (SLA) that may be associated with a primary storage provision, according to some embodiments.

FIG. 3B illustrates portions of an example service level agreement (SLA) that may be associated with an opportunistic storage provision, according to some embodiments.

Figure 1A:
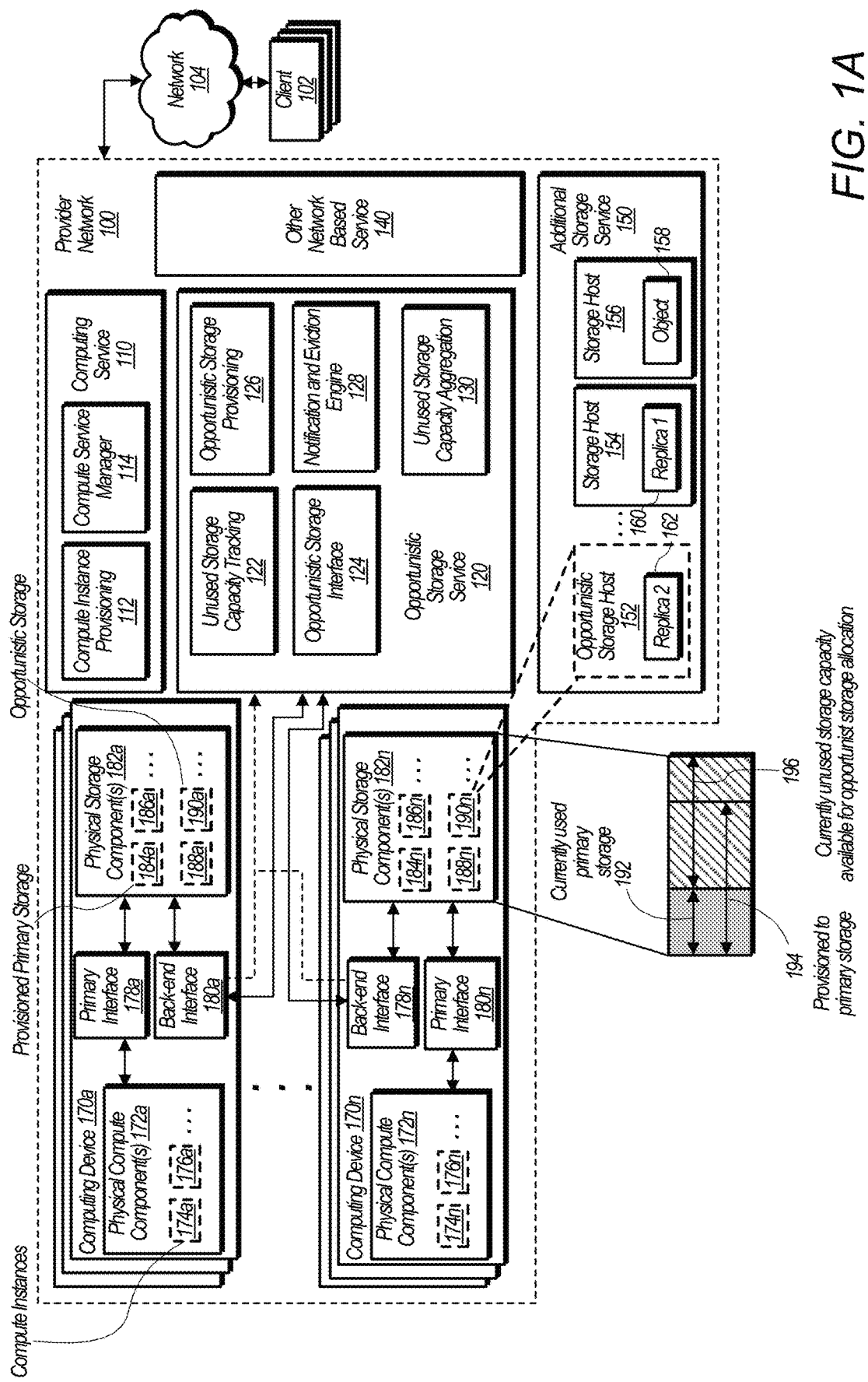
FIG. 1A illustrates a block diagram of a provider network, wherein local storage capacity of a local storage component is made available for use by a local compute instance and an unused portion of the storage capacity of the local storage component is opportunistically provisioned for use by another service or client as opportunistic storage subject to revocation, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement a computer virtualization service that offers high-performance local storage for compute instances provisioned to clients of the computer virtualization service. The system and methods described herein may further implement an opportunistic storage service that identifies unused storage capacity on local physical storage components associated with local computing components that implement compute instances with high-performance local storage. The opportunistic storage service may provision currently unused storage capacity of local physical storage components as opportunistic storage capacity that is subject to revocation with limited notice or no notice. In some embodiments, opportunistic storage capacity may be revoked in whole or in part in response to additional storage space on one or more local physical storage components being required to store data for a compute instance with an associated high-performance local storage. In some embodiments, a physical storage component used to provide storage capacity to a compute instance may be located in a same computing device (e.g. server or resource host) as one or more physical compute components that implement the compute instance. In some embodiments, compute components and storage components of a computing device may be located in a common chassis of the computing device or may be mounted in adjacent chassis.

In some embodiments, local physical storage components included in computing devices, such as servers or resource hosts, may be over-subscribed. For example, an amount of storage capacity provisioned on a local physical storage component may represent a full amount of capacity of the local physical storage component. However, not all of the provisioned storage capacity of the local physical storage component may be used to actually store data at a given point in time. In such circumstances the "currently unused" portion of the capacity of the local physical storage component may be additionally provisioned as opportunistic storage capacity. As can be seen, the sum of the primary provisioned storage capacity on the local physical storage component and the opportunistically provisioned storage capacity on the local physical storage component may exceed the actual physical storage capacity of the local physical storage component. Thus, the local physical storage component may be said to be "oversubscribed" because the provisioned capacity exceeds the actual capacity of the local physical storage component. In some embodiments, storage capacity may be oversubscribed, also transactional capacity may be oversubscribed, and/or other capacities of a physical storage component may be oversubscribed.

Also, in some embodiments, storage capacity on a local physical storage component may be provisioned to multiple clients of a provider network. Thus, the local physical storage component may be said to be a "multi-tenant" storage device. For example, in some embodiments, primary storage capacity on the local physical compute component may be provisioned as primary storage for multiple local compute instances. Additionally, in some embodiments, opportunistic storage capacity on a local physical storage component may be provisioned to other clients or respective ones of the same clients. Moreover, in some embodiments, primary storage may be elastic up to a maximum provisioned amount. For example, as additional space is required to store data for a primary storage provision, opportunistic storage provisions may be revoked to free up additional space on the local physical storage component to store data for the primary storage provision. Also, in some embodiments, if a transaction threshold is met, such as a total transaction volume per unit of time, an opportunistic storage provision may be revoked, blocked, or throttled to free up additional transaction capacity for a primary storage provision.

In some embodiments, "currently unused" storage capacity may be made available as opportunistic storage capacity in isolated pools of storage capacity on separate ones of a plurality of local physical storage components included in computing devices of a provider network, such as servers or resource hosts. In some embodiments, "currently unused" storage capacity may be aggregated into a logical virtualized storage resource and presented to a client via an API as a state-full storage service that offers virtual storage resources implemented using opportunistic storage capacity.

In some embodiments, "currently unused" storage capacity may be advertised to clients as simply an availability of the opportunistic storage service to store data, for example without specifying exactly where the data will be stored. In some embodiments, an opportunistic storage service may indicate a "green" state if there is ample "currently unused" storage capacity, a "yellow state" if there is moderate "currently unused" storage capacity, and a "red state" if there is limited "currently unused" storage capacity. A client may decide whether or not to store data to the opportunistic storage capacity based on the current state (e.g. green, yellow, red). The state of the opportunistic storage service may indicate to the client a likelihood of whether or not the client's opportunistic storage capacity will be revoked. For example, if there is a limited amount of currently unused storage capacity (e.g. a red state), there may be a greater likelihood that opportunistic storage capacity will be revoked to provide storage capacity for storing data for a primary storage provision. However, if the state of the opportunistic storage service indicates that there is ample currently unused storage capacity (e.g. a green state), it may indicate to the client that revocation of opportunistic storage capacity to be provisioned to the client is unlikely.

Also, in some embodiments, an opportunistic storage service may not guarantee to a client that an advertised opportunistic storage capacity pool has not been revoked. Thus, a client may have a better likelihood of successfully writing to an opportunistic storage capacity pool in a "green state" than in a "red state", but in either circumstance, the client may not be guaranteed to be able to write to the advertised opportunistic storage capacity. For example, in some embodiments, an opportunistic storage service may not track a current state of advertised opportunistic storage capacity. In such embodiments, currently unused storage capacity may be identified at a physical storage component and added to a list of opportunistic storage capacity to be advertised via an opportunistic storage capacity service. However, in the intervening time between the currently unused storage capacity being identified, added to the list of advertised opportunistic storage capacity, provisioned to a client, and targeted with a write request, the opportunistic storage capacity may be revoked. In such circumstances, the opportunistic storage service may not track the state of the advertised opportunistic storage capacity, but may instead communicate to the client that the write request has failed because the targeted opportunistic storage capacity has been revoked.

In some embodiments, the client may not be made aware of the physical location of the client's opportunistic storage capacity. For example, a client may provide data objects to an opportunistic storage service interface and may be issued a key for the data objects. The opportunistic storage service may then select currently unused storage capacity on one or more physical storage components of one or more computing devices at which to store the data objects for the client. The opportunistic storage service may further maintain an index that indicates storage locations for the data objects and key values for the data objects. However, the client may interact with the opportunistic storage service interface using the assigned key values for the data objects without being aware of where the data objects are being stored.

In some embodiments, an opportunistic storage service may be implemented locally on a computing device or across multiple computing devices. In some embodiments, a local opportunistic storage service interface implemented on a local computing device that comprises a physical compute component and a physical storage component, may advertise "currently unused" storage capacity on the physical storage component of the local computing device as opportunistic storage capacity. In some embodiments, an opportunistic storage service interface may be implemented on one or more computing devices that coordinate with computing devices with local physical compute components and local physical storage components to vend "currently unused" storage capacity on the local physical storage components as opportunistic storage capacity. In some embodiments, a physical storage component of a computing device may include at least one hybrid component that performs at least some processing tasks. For example, in some embodiments, a local processing component of a physical storage component may implement in whole or in part a back end interface to the physical storage component, and/or an opportunistic storage service interface. For example, in some embodiments, a physical storage component such as a shelf of storage devices may also include a processing component with a network connection. The processing component may coordinate back-end access to the physical storage component, and in some embodiments, implement a local opportunistic storage service interface for the physical storage component or may coordinate with one or more other computing devices implementing an opportunistic storage service.

In some embodiments, an opportunistic storage service may be implemented independently for each computing device of a plurality of computing devices of a provider network, wherein each of the computing devices include a physical compute component that implements compute instances for a compute service and a physical storage component that implements primary storage for the compute instances, wherein currently unused storage capacity on the physical storage component is provisioned as opportunistic storage capacity. In some embodiments, an opportunistic storage service may be implemented at a rack level, room level, data center level, or across multiple data centers of a provider network.

In some embodiments, currently unused storage capacity on a physical storage component of a computing device that also includes a physical compute component that implements a compute instance provisioned primary storage on the physical storage component, may be provisioned back to the compute instance as opportunistic storage capacity. Also, the currently unused storage capacity may be provisioned to an additional service of the provider network that stores data for the compute instance.

In some embodiments, an amount of opportunistic storage capacity offered to a client or clients by an opportunistic storage service may dynamically grow and shrink based on respective amounts of "currently unused" storage capacity that are available on local physical storage components of computing devices of a provider network. For example, as more data is stored to a primary storage provisioned on a physical storage component, the currently unused storage capacity may shrink. Conversely, as data is deleted from a primary storage provision provisioned on the physical storage component, the currently unused storage capacity may grow.

In some embodiments, an opportunistic storage service may provide clients a notification or other type of alert indicating that data stored on opportunistic storage is likely to be lost due to revocation of the opportunistic storage provision. In some embodiments, an opportunistic storage service may provide a client with an indication of a time remaining before an opportunistic storage provision is revoked. In some embodiments, a client may manage relocating data likely to be lost due to revocation to another opportunistic storage provision or other destination. In some embodiments, an opportunistic storage service may automatically manage relocating a client's data to another opportunistic storage provision when the data is likely to be lost due to an opportunistic storage provision being revoked. In some embodiments, an opportunistic storage service may provision opportunistic storage for an upfront fixed amount of time. For example, an opportunistic storage service may provision opportunistic storage capacity for an amount of time (e.g. a day, a week, a month, etc.) subject to revocation during the amount of time (e.g. the day, the week, the month, etc.) and may revert the provisioned opportunistic storage capacity to available opportunistic storage capacity available to be provisioned at the end of the fixed amount of time (e.g. the day, the week, the month, etc.).

In some embodiments, an opportunistic storage service may identify "currently unused" storage capacity on local storage components of a large fleet of computing devices, such as servers or resource hosts of a provider network. For example, an opportunistic storage service may identify "currently unused" storage capacity on local storage components of a fleet of computing devices in a rack, data center hall, data center, or multiple data centers.

While, an amount of "currently unused" storage capacity available for opportunistic storage on any given local physical storage components or small set of local physical storage components of a small set of computing devices may fluctuate considerably and may be some-what unpredictable, an amount of "currently unused" storage capacity available across a large fleet of computing devices (e.g. servers or resource hosts) of a provider network may be stable and predictable due to common storage resource utilization trends of clients of the provider network. For example, while some clients may momentarily use a large portion of a primary storage provision, other clients may momentarily use a lesser portion of a primary storage provision. In this way, variabilities in storage consumption may average out and result in stable and predictable free space across a fleet of computing devices such as servers or resource hosts of a provider network. Thus, an opportunistic storage service may offer free space with a high-level of confidence across a fleet of computing devices of a provider network, despite variability in available opportunistic storage capacity on local physical storage components of particular ones of the computing devices.

In some embodiments, an opportunistic storage service may track physical bytes accessed by particular customers on local physical storage components of computing devices (for example bytes accessed by primary storage clients and opportunistic storage clients) and may enforce deterministic service levels per customer down to the physical media access level. For example, an opportunistic storage service may arbitrate conflicting demands for access to physical storage media between primary storage clients and opportunistic storage clients, such that service level agreements for the primary storage clients are not violated due to opportunistic storage transactions. For example, in some embodiments, client data for different clients may be isolated on different physical storage units of a physical storage component, such as an NAND array or SSD (solid-state device). In such embodiments, a controller of the physical storage component, in coordination with an opportunistic storage service, may block or throttle transactions to a physical storage unit associated with opportunistic storage in order to provide additional capacity to process transactions directed to another physical storage unit associated with primary storage. In contrast, typical controllers for NAND arrays or SSDs may apply a best effort approach for all transactions. Such an arrangement would allow opportunistic transactions to consume transaction capacity and negatively affect performance of primary storage transactions during periods of high transaction volume. In some embodiments, a service level agreement (SLA) for a primary storage may guarantee at least a fixed amount of transactions per second, whereas a SLA for an opportunistic storage may guarantee eventual completion of transactions subordinate to the primary storage provision being able to complete at least the fixed amount of transactions per second.

In some embodiments, primary storage data and opportunistic storage data may be stored on the same physical storage unit and may be logically segregated by an opportunistic storage service.

In some embodiments, a local physical storage component may appear to a local compute instance as a directly connected device, such as an NVMe device (non-volatile memory express device).

In some embodiments, clients of an opportunistic storage service may interact with one or more service interfaces, such as a provisioning interface and/or an opportunistic storage service interface. Additionally, the opportunistic storage service may be connected via a back-end interface to respective local physical storage components of computing devices (e.g. servers or resource hosts that implement a primary storage service or compute virtualization service of a provider network). The opportunistic storage service may identify currently unused storage capacity via the back-end interface to the local physical storage components. The opportunistic storage service may then advertise the currently unused storage capacity as opportunistic storage capacity and provision the opportunistic storage capacity to another client. Also, an opportunistic storage service interface of an opportunistic storage service may receive requests to store and retrieve data to or from the provisioned opportunistic storage and route the request to the local physical storage components of the computing devices of the primary storage service that implement the opportunistic storage via the back-end interface to the local physical storage components of the computing devices. As mentioned above, in at least some embodiments, the opportunistic storage service may be locally implemented at each back end interface, or may be implemented as a distributed system that interacts with back-end interfaces of a plurality of computing devices.

In some embodiments, distributed systems of a provider network may host various resource instances, such as compute resource instances and storage resource instances, for performing or implementing different systems, services, applications and/or functions. In some embodiments, resource instances may be of many different types and may be hosted at one or more computing devices or virtual computing devices of a distributed system, such as one of various types of physical or virtualized computing resources, storage resources, or networking resources.

In at least some provider networks, a network-accessible virtual compute service may be established, enabling clients to utilize virtualized compute resources (which may also be referred to as "compute instances" herein) set up on their behalf at computing devices managed by the provider network operator. A given computing device (e.g. server or resource host) may implement, at a given point in time, one or more compute instances, as well as a virtualization management software stack (e.g., a hypervisor and/or one or more administrative operating system instances). Computing devices (e.g. servers or resource hosts) may also include local storage components, such as NAND flash arrays, solid-state drives, hard disk drives, or other types of storage devices that are mounted in a same chassis as compute components of the computing devices, or that are mounted proximate to the compute components of the computing device. In some embodiments, currently unused storage capacity on any of these or other types of storage devices may be advertised and provisioned as opportunistic storage capacity by an opportunistic storage service.

In some embodiments, a compute instance may be implemented with storage capacity such that a portion of a local storage component is made available to store data for the compute instance. In some embodiments, a portion of a local storage component may be provisioned as a primary storage resource and may be associated with one or more compute instances, wherein the primary storage resource is made available to store data for the associated one or more compute instances up to a maximum provisioned storage capacity.

Often a full maximum amount of storage capacity of a primary storage provisioned on a local storage component may not be used to store data for one or more associated compute instances at a given moment in time, such as a current moment in time. Thus, a portion of the local storage component may be provisioned but "currently unused." In such situations, an opportunistic storage service may identify the "currently unused" storage capacity of the local storage component and/or additional "currently unused" storage capacity on other local storage components that are local to other compute instances. The opportunistic storage service may offer the "currently unused" storage capacity as opportunistic storage capacity to other clients, services, or even to the same client(s). In some embodiments, the opportunistic storage capacity may be offered with minimal availability guarantees and may be subject to revocation with limited notice, or with no notice, in response to storage pressure on the local physical storage component requiring additional capacity on the local storage component to be made available for use as primary storage or to be made available for use by a compute instance that is offered with integrated storage capacity.

According to some embodiments, a block-based storage service of a provider network, such as may be used to provide primary high-performance storage to a compute instance using local physical storage components of a computing device that includes a local physical compute component that implements the compute instance, may enable clients to create or instantiate virtual block storage devices, such as mountable block-level storage volumes. The virtual block storage devices may implement block device programmatic interfaces for I/O, and may enable one or more storage volumes to be programmatically attached to a compute instance to support block-level I/O operations from the compute instance. In some embodiments, for example, a block-based storage service may expose a "CreateVolume" application programmatic interface (API), enabling clients to specify a volume size, as well as various other parameters such as a provisioned performance level to be supported by the block-based storage service (expressed in units such as block I/O operations per second) for a requested volume. An "AttachVolume" API may be supported in such an embodiment to programmatically attach a specified volume to a specified compute instance. After a given volume implemented by the block-based storage service is attached to a compute instance, in some embodiments, the compute instance may interact with the volume just as it would interact with a local drive, e.g., formatting the volume with a file system and/or installing applications on the volume. Thus, the volumes provided by the block storage service may behave analogously to raw unformatted external hard drives from the perspective of the compute instances.

In at least some embodiments, a service provider network may additionally offer another storage service, such as a storage repository service that exposes a web-services interface rather than a block device interface. In some embodiments, a storage repository service may be an object-based storage service as opposed to a block-based storage service.

For example, in at least some embodiments, a repository storage service may be configured to store key-value objects, e.g. the repository storage service may be an object-based storage service where each object is simply considered as an unstructured collection of bits identified by a key. As opposed to the block device interfaces implemented by the block-based storage service, in at least some embodiments the repository service may implement a web services API, so that, for example, clients of the repository service may store data directly to, and access data directly from, the repository service without being required to attach or mount any devices, and without necessarily using compute instances of the provider network. In various embodiments, the provider network may support high data durability levels, for either the block-based storage service, the storage repository, or both. Various types of data replication techniques, such as full replication or erasure coding algorithms, may be used to ensure the desired data durability in different embodiments.

In some embodiments, opportunistic storage offered by an opportunistic storage service may be offered as block-based storage, object-based storage, file-based storage, or other storage types.

In some embodiments, a service provider network may comprise a plurality of computing devices, such as resource hosts. In some embodiments, each computing device may comprise a physical compute component and a physical storage component. Additionally, a service provider network may comprise a computing service implemented via one or more computing devices, and a storage service implemented via one or more computing devices. The computing service may be configured to provision compute instances to clients of the service provider network, wherein for respective ones of the compute instances, a physical compute component that implements the compute instance is included in a same computing device (or resource host) as one or more physical storage components that provide provisioned primary storage capacity for the compute instance.

The storage service may be configured to identify currently unused provisioned primary storage capacity on the one or more physical storage components included in the computing devices of the provider network, wherein, for respective ones of the compute instances, a portion of the provisioned primary storage capacity for the compute instance is being used to store data for the compute instance and an unused portion of the provisioned primary storage capacity for the compute instance is currently not being used to store data for the compute instance. The storage service may also be configured to advertise the currently unused provisioned storage capacity as opportunistic storage capacity available to be provisioned to another client of the service provider network. Additionally, the storage service may provision, to the other client, as opportunistic storage capacity, at least a portion of the currently unused provisioned primary storage capacity, wherein the opportunistic storage capacity is provisioned subject to revocation upon an additional portion of the provisioned primary storage capacity being required to store data for a respective one of the compute instances.

In some embodiments, a system comprises one or more computing devices configured to implement a storage service configured to identify currently unused provisioned storage capacity on physical storage components included in computing devices of a provider network, wherein respective ones of the computing devices of the provider network comprise a physical storage component and a physical compute component. The storage service may also be configured to advertise the currently unused provisioned storage capacity on the physical storage components as opportunistic storage capacity. The storage service may also provision at least a portion of the currently unused provisioned storage capacity on the physical storage components as opportunistic storage capacity. The opportunistic storage capacity may be provisioned subject to revocation based on an additional portion of one or more physical storage components being used to store data for one or more compute instances to which the provisioned storage capacity is provisioned. Also, the one or more compute instances may be implemented via one or more of the physical compute components of the computing devices of the provider network.

In some embodiments, a method includes provisioning storage capacity to a first client on one or more physical storage components included in a computing device that includes one or more physical compute components that implement a compute instance provisioned to the first client. The method also includes advertising, via an opportunistic storage service interface, currently unused storage capacity on the one or more physical storage components as opportunistic storage capacity available to be provisioned to other clients and provisioning, to a given one of the other clients, at least a portion of the currently unused storage capacity on the one or more physical storage components as opportunistic storage capacity, wherein the opportunistic storage capacity is subject to revocation based on a greater portion of the one or more physical storage components being used for storage provisioned to the first client.

FIG. 1 illustrates a block diagram of a provider network, wherein local storage capacity of a local storage component is made available for use by a local compute instance and an unused portion of the storage capacity of the local storage component is opportunistically provisioned for use by another service or client as opportunistic storage subject to revocation, according to some embodiments.

Provider network 100 may be set up by an entity such as a company or a public sector organization to provide one or more services (such as various types of cloud-based computing or storage services) accessible via the Internet and/or other networks to clients 102. Provider network 100 may include numerous data centers hosting various pools of computing devices, such as collections of physical and/or virtualized computer servers, storage devices, networking equipment and the like (e.g., computing system 900 described below with regard to FIG. 9 or computing devices 170a-170n illustrated in FIG. 1), needed to implement and distribute the infrastructure and services offered by the provider network 100.

In some embodiments, provider network 100 may provide computing resources, such as via virtual computing service 110, and storage services, such as primary storage associated with compute instances offered by computing service 110 or block-based storage offered by a block-based storage service that implements block-based storage using physical storage components included in computing devices that implement compute instances offered by the computing service 110. In some embodiments, a provider network may also include an object-based storage service (which may include various storage types such as object/key-value based data stores or various types of database systems) (e.g. additional storage service 150), and/or any other types of network-based services 140.

Clients 102 may access these various services offered by provider network 100 via network 104. Likewise network-based services may themselves communicate and/or make use of one another to provide different services. For example, computing resources offered to clients 102 in units called "instances," such as virtual or physical compute instances, may make use of other resources, such as provisioned primary storages 184a, 186a through 184n, 186n, providing local storage or virtual block storage for the compute instances 174a, 176a through 174n, 176n.

As noted above, virtual computing service 110 may offer various compute instances to clients 102 and may include a compute instance provisioning interface 112 and a compute service manager 114. A virtual compute instance may, for example, be implemented on one or more computing devices (e.g. computing devices 170a through 170n) that comprise one or more physical compute components 172a through 172n with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singularly or in combination to implement the compute instances of virtual computing service 110 in different embodiments, including special purpose computer servers, storage devices, network devices and the like. In some embodiments instance clients 102 or any other user may be configured (and/or authorized) to direct network traffic to a compute instance. In various embodiments, compute instances may attach or map to one or more primary storage or data volumes, such as primary storages 184a, 186a through 184n, 186n implemented via physical storage components 182a through 182n of computing devices 170a through 170n.

Compute instances may operate or implement a variety of different platforms, such as general purpose operating systems, application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 102 to access an instance.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic may be specified for a compute instance. Configurations of compute instances may also include their location, in a particular data center, availability zone, geographic, location, etc. . . . and (in the case of reserved compute instances) reservation term length.

In some embodiments, a client, such as client 102, may request a compute instance having a particular configuration via a compute instance provisioning interface, such as compute instance provisioning interface 112, and a compute service manager, such as compute service manager 114, may cause the compute instance to be implemented on computing devices of the provider network, such as computing devices 170a through 170n. In some embodiments, a compute instance configuration may include a provisioned amount of primary storage on an associated computing device that implements the compute instance. For example, compute instances 174a, 176a may be provisioned with provisioned primary storages 184a and 186a, wherein both the physical compute components 172a and physical storage components 182a that implement the compute instances 174a and 176a and provisioned primary storages 184a and 186a are included in the same computing device 170a.

In some embodiments, a primary interface of a computing device, such as primary interface 178a or 178n, may connect physical compute components of the computing device, such as physical compute components 172a, to physical storage components of the computing device, such as physical storage components 182a. In some embodiments, primary storage provisioned on a local physical storage component that is local to a physical compute component that implements a compute instance may provide a transaction performance level up to or greater than 100,000 transactions per second between the compute instance and the provisioned primary storage via a primary interface, such as primary interface 178a.

In some embodiments, a provider network, such as provider network 100, includes an opportunistic storage service that advertises and provisions currently unused storage capacity as opportunistic storage capacity subject to revocation. In some embodiments, an opportunistic storage service, such as opportunistic storage service 120, may be connected to computing devices, such as computing devices 170a through 170n via a back-end interface to physical storage components of the computing devices. For example, back-end interface 180a connects unused storage capacity tracking 122 and opportunistic storage interface 124 of opportunistic storage service 120 to physical storage components 182a of computing device 170a. In a similar manner, back-end interface 180n connects unused storage capacity tracking 122 and opportunistic storage interface 124 of opportunistic storage service 120 to physical storage components 182n of computing device 170n. In some embodiments, an opportunistic storage service, such as opportunistic storage service 120, may be locally implemented at a computing device, such as one of computing devices 170a through 170n, and may be combined with a back-end interface to the computing device.

In some embodiments, a primary interface and a back-end interface may be configured in various ways. For example, in some embodiments, a back-end interface, such as back-end interface 180a, may be a network connection that connects to a primary interface, such as primary interface 178a, to allow communications via the back end interface between physical storage components of a computing device and an opportunistic storage service. For example, in some embodiments, a primary interface may be a communication bus that connects physical computing components, such as processors, with local storage devices, such as an NAND array, an SSD, or a hard drive.

The communication bus may also connect a back-end interface, such as a network interface that operates as a back-end interface, to the physical storage components and/or physical compute components of a computing device. In some embodiments, the back-end interface may include at least some processing capabilities and may also implement in whole or in part an opportunistic storage service.

In some embodiments, an unused storage capacity tracking element of an opportunistic storage service, such as unused storage capacity tracking 122, may track an amount of currently unused storage capacity on a plurality of physical storage components, such as physical storage components 182a through 182n of computing devices 170a through 170n, or on local physical storage components in embodiments wherein the opportunistic storage service is locally implemented. In some embodiments, a physical storage component of a computing device may include a controller that allows visibility to an opportunistic storage service to the physical storage media access level of a physical storage component to determine which portions of the physical storage component are currently being used to store data for a primary storage provision and which portions of the physical storage component are currently unused and available to store data for the opportunistic storage service.

In some embodiments, an opportunistic storage service, such as opportunistic storage service 120, may include an unused storage capacity aggregation element, such as unused storage capacity aggregation element 130. The unused storage capacity aggregation element may aggregate a currently available amount of unused storage capacity across a plurality of physical storage components and may continuously or periodically update the aggregated amount based on changes in currently unused storage capacity. In some embodiments, an opportunistic storage provisioning element of an opportunistic storage service, such as opportunistic storage provisioning 126, may offer currently unused storage capacity to clients of the opportunistic storage service as opportunistic storage capacity subject to revocation.

In some embodiments, opportunistic storage capacity may be offered as discrete pools of capacity on particular physical storage components, wherein an opportunistic storage service client is provided an endpoint address for the physical storage device that includes the currently unused storage capacity that is being offered as opportunistic storage capacity. In other embodiments, a client may not be made aware of endpoint addresses of physical storage devices that store opportunistic storage data for the client. In other embodiments, an opportunistic storage service client may interact with a provisioned opportunistic storage capacity pool via an opportunistic storage service interface, such as opportunistic storage service interface 124. In some embodiments, an opportunistic storage service interface may track on which physical storage component data for an opportunistic storage service client is stored and may route communications between the opportunistic storage service client and a back-end interface associated with the physical storage component that stores the opportunistic data for the opportunistic storage service client. In some embodiments, the opportunistic storage service may present the opportunistic storage to a client as block-based storage, object-based storage, file-based storage, or as other types of storage. In some embodiments, the routing of communications to and from the back-end interface may be transparent to the opportunistic storage service client.

In some embodiments, opportunistic storage may be provisioned to an opportunistic storage service client as a virtualized storage resource implemented using opportunistic storage. For example, an opportunistic storage provisioning element, such as opportunistic storage provisioning 126, may advertise and provision a virtual storage instance to a client as a virtual storage volume and the opportunistic storage service may manage which pools of opportunistic storage are used to implement the virtual storage instance. In such embodiments, an opportunistic storage service may automatically relocate client data between opportunistic storage capacity pools on various physical storage components, for example in response to revocation or anticipated revocation of an opportunistic storage capacity pool. For example, if a given one of opportunistic storage capacity pools 188a, 190a are to be revoked to make more space available to store data for provisioned primary storage capacity 184a, 186a, an opportunistic storage provisioning element, such as opportunistic provisioning 126, may identify an available opportunistic storage capacity pool, such as one of opportunistic storage capacity pools 188n, 190n, and may relocate data from the opportunistic storage capacity pools 188a, 190a to the opportunistic storage capacity pools 188n, 190n.

In some embodiments, an opportunistic storage service may alternatively provide a notification to a client that an opportunistic storage capacity pool provisioned to the client is to be revoked, and the client may manage relocating data stored to the to-be-revoked opportunistic storage capacity pool. For example, notification and eviction engine 128 of opportunistic storage service 120 may provide a notification to client 102 that opportunistic storage capacity pool 188a or 190a provisioned to the client 102 is to be revoked. In some embodiments, the notification may indicate a remaining amount of time until the opportunistic storage capacity is revoked. In some embodiments the client may move data from the opportunistic storage capacity pool 188a or 190a to another destination such as another opportunistic storage capacity pool on another physical storage component of the same computing device or another computing device of the service provider network.

For example, FIG. 1 illustrates a diagram of storage capacity for physical storage component 182n. As can be seen, an amount of storage capacity on the physical storage component is provisioned as primary storage capacity 194. However, only a portion of this provisioned storage capacity is actually used to store data for the primary storage. For example, only portion 192 of the provisioned storage capacity 194 is currently being used to store data for the primary storage. This leaves a pool of currently unused storage capacity 196 available to be provisioned as opportunistic storage capacity. However, the opportunistic storage capacity may be revoked on short notice or without notice if additional data is stored to the primary storage causing a greater portion of the provisioned storage capacity 194 to be currently used to store data for the primary storage.

In some embodiments, opportunistic storage may be provisioned to clients of a service provider network, or may be provisioned to internal services of a service provider network. For example, additional storage service 150 stores object 158 on storage host 156 and replica 160 of object 158 on storage host 154. Additionally, additional storage service 150 is provisioned opportunistic storage capacity pool 190$n$ on physical storage component 182$n$ of computing device 170$n$. The opportunistic storage capacity pool 190$n$ is used an "opportunistic" or "virtual" storage host 152 of the additional storage service 150 that stores replica 2 (162) of object 158. In some embodiments, a client or service that utilizes opportunistic storage capacity may store data at least partially redundantly, such that if a particular opportunistic storage capacity pool is revoked, the data stored to the opportunistic storage capacity pool can be lost and re-created from data redundantly stored to other storage hosts or other opportunistic storage capacity pools. For example, if opportunistic storage capacity pool 190$n$ is revoked, additional storage service 150 can re-create replica 2 (162) from replica 1 (160) or from object 158. In this way, risk of data loss due to revocation can be reduced while taking advantage of currently unused storage capacity that would otherwise go un-used.

In some embodiments, provider network 100 may implement other network-based services 140, which may include various different types of analytical, computational, storage, or other network-based system allowing clients 102, as well as other services of provider network 100 (e.g., computing service 110 and/or additional storage service 150) to perform or request various tasks.

Clients 102 may encompass any type of client configurable to submit requests to provider network 100. For example, a given client 102 may include a suitable version of a web browser, or may include a plug-in module or other type of code module configured to execute as an extension to or within an execution environment provided by a web browser. Alternatively, a client 102 may encompass an application such as a database application (or user interface thereof), a media application, an office application or any other application that may make use of compute instances 174$a$, 176$a$ through 174$n$, 176$n$, or other network-based service in provider network 100 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 102 may be configured to generate network-based services requests according to a Representational State Transfer (REST)-style network-based services architecture, a document- or message-based network-based services architecture, or another suitable network-based services architecture. In some embodiments, a client 102 (e.g., a computational client) may be configured to provide access to a compute instance 174$a$, 176$a$ through 174$n$, 176$n$ or provisioned primary storages 184$a$, 186$a$, through 184$n$, 186$n$ in a manner that is transparent to applications implemented on the client 102 utilizing computational resources provided by the compute instances 174$a$, 176$a$ through 174$n$, 176$n$.

Clients 102 may convey network-based services requests to provider network 100 via external network 104. In various embodiments, external network 104 may encompass any suitable combination of networking hardware and protocols necessary to establish network-based communications between clients 102 and provider network 100. For example, a network 104 may generally encompass the various telecommunications networks and service providers that collectively implement the Internet. A network 104 may also include private networks such as local area networks (LANs) or wide area networks (WANs) as well as public or private wireless networks. For example, both a given client 102 and provider network 100 may be respectively provisioned within enterprises having their own internal networks. In such an embodiment, a network 104 may include the hardware (e.g., modems, routers, switches, load balancers, proxy servers, etc.) and software (e.g., protocol stacks, accounting software, firewall/security software, etc.) necessary to establish a networking link between given client 102 and the Internet as well as between the Internet and provider network 100. It is noted that in some embodiments, clients 102 may communicate with provider network 100 using a private network rather than the public Internet.

Figure 1B:
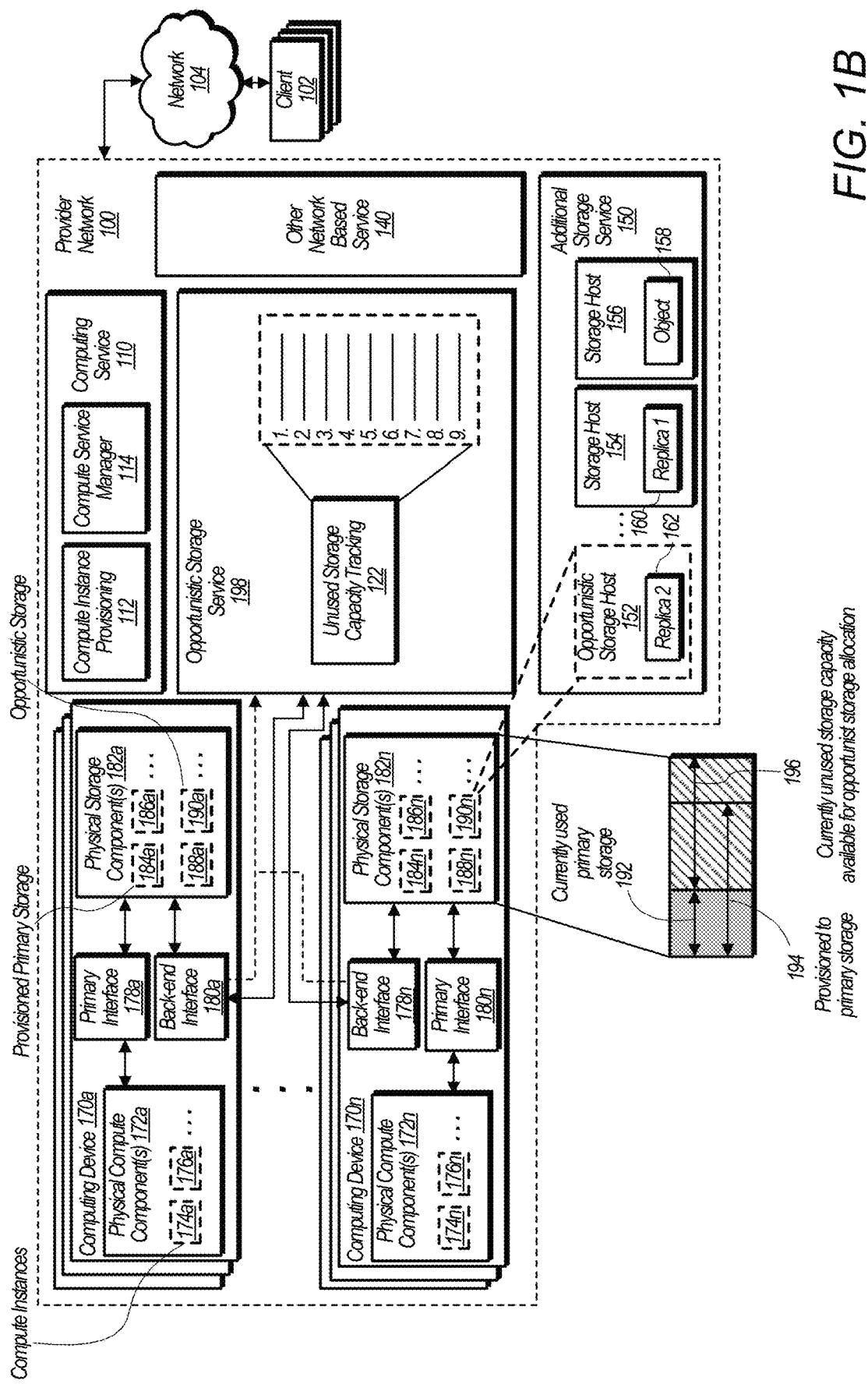
FIG. 1B illustrates a block diagram of a provider network, wherein local storage capacity of a local storage component is made available for use by a local compute instance and an unused portion of the storage capacity of the local storage component is opportunistically provisioned for use by another service or client as opportunistic storage subject to revocation, according to some embodiments.

FIG. 1B illustrates a block diagram of a provider network, wherein local storage capacity of a local storage component is made available for use by a local compute instance and an unused portion of the storage capacity of the local storage component is opportunistically provisioned for use by another service or client as opportunistic storage subject to revocation, according to some embodiments.

In some embodiments, an opportunistic storage service, such as opportunistic storage service 198, may not manage state of currently unused storage, but may instead maintain a list of physical storage components that have been identified as having currently unused storage. The opportunistic storage service, may then advertise the list of physical storage components to clients 102 and the clients may be provisioned opportunistic storage capacity on a physical storage component from the list. The client may then attempt to write data to the provisioned opportunistic storage capacity on the physical storage component. If there is sufficient currently unused storage capacity at the time of the write from the client, the data may be stored to the provisioned opportunistic storage capacity on the physical storage component. Otherwise, the write may fail and the client may be informed that the opportunistic storage capacity has been revoked. In some embodiments, a simplified opportunistic storage service 198, may further include an opportunistic storage interface, such as opportunistic storage interface 124. In some embodiments, a client, such as client 102, may write a data object to a provisioned opportunistic storage capacity pool via an opportunistic storage service interface, and the opportunistic storage service interface may associate a key with the data storage object and maintain an index of where the data storage object corresponding to the key is stored. In such embodiments, the client may not be aware of which physical storage component upon which the client is provisioned opportunistic storage capacity.

In some embodiments, a client, such as client 102, may store a data object to multiple opportunistic storage capacity pools, anticipating that at least some of the opportunistic storage capacity pools will be revoked, while it is highly unlikely that all of the opportunistic storage capacity pools will be revoked.

Figure 2:
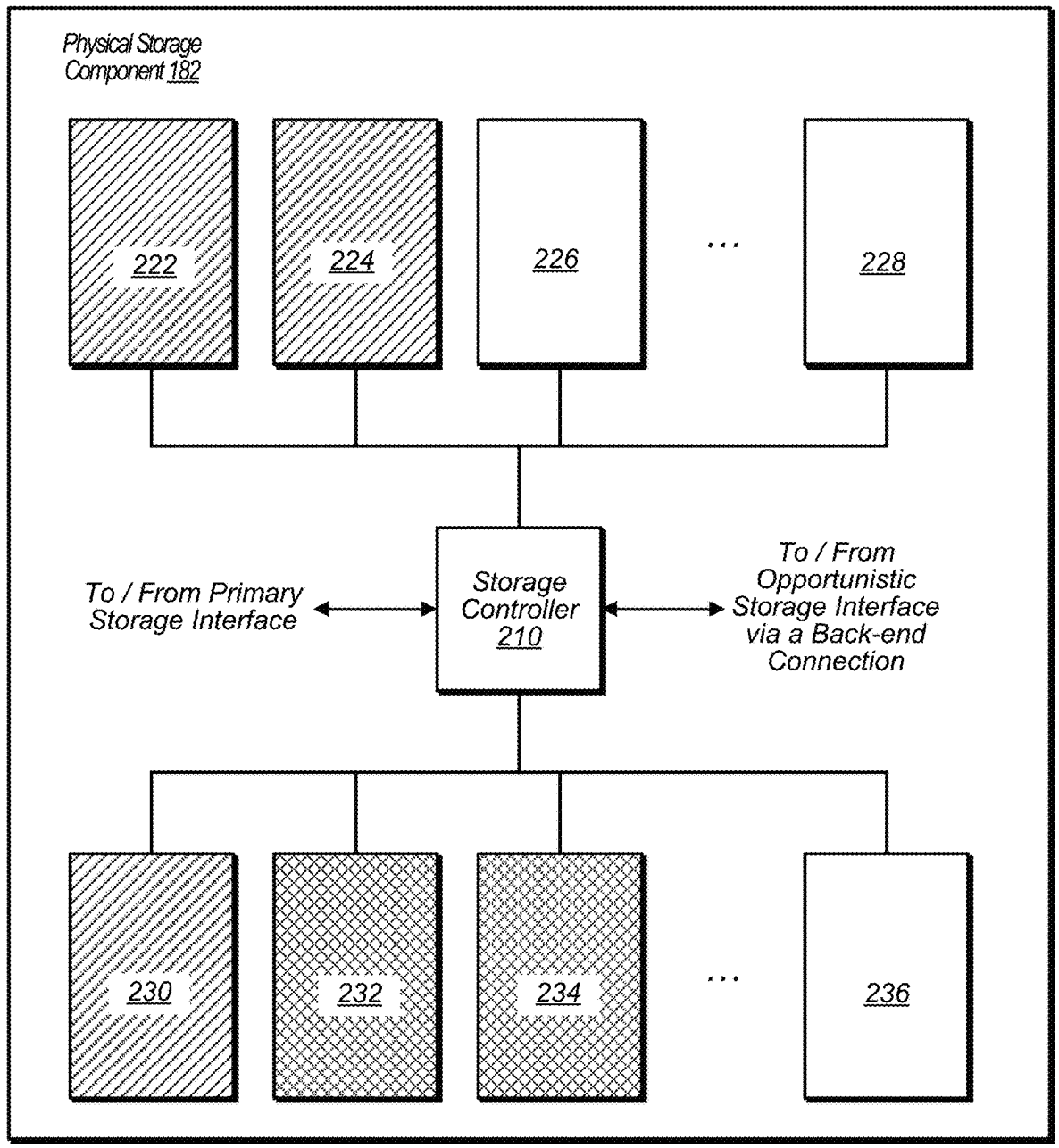
FIG. 2 illustrates a block diagram of a physical storage device, such as a storage component of a computing device, wherein a controller for the physical storage device, in coordination with an opportunistic storage service, tracks portions of the physical storage device used to store data for a primary storage provision and tracks other portions of the storage device used to store data for an opportunistic storage provision, according to some embodiments.

FIG. 2 illustrates a block diagram of a physical storage device, such as a storage component of a computing device, wherein a controller for the physical storage device, in coordination with an opportunistic storage service, tracks portions of the physical storage device used to store data for a primary storage provision and tracks other portions of the storage device used to store data for an opportunistic storage provision, according to some embodiments.

As an example, physical storage component, physical storage component 182 illustrated in FIG. 2 may be a solid state storage drive or other storage device that includes physical storage units 222, 224, 226, 228, 230, 232, 234, and 236. Physical storage component 182 illustrated in FIG. 2 may be the same as one or more of the physical storage components 182a through 182n illustrated in FIG. 1. In some embodiments, a physical storage component, such as an SSD, may include any number of storage portions, such as physical storage units 222, 224, 226, 228, 230, 232, 234, and 236. Additionally, a physical storage component, such as physical storage component 182, may include a storage controller, such as storage controller 210.

In some embodiments, a storage controller of a physical storage component, such as storage controller 210, may segregate data stored for different clients or different types of storage provisions, such that the segregated data is stored on different portions of the physical storage component. In some embodiments, a storage controller, such as storage controller 210, may segregate data for different clients or types of storage in coordination with an opportunistic storage service. For example, data to be stored by the controller may be identified as opportunistic storage data and may be segregated from primary storage data. For example, physical storage units 222, 224, and 226 store primary storage data and physical storage units 232 and 234 store opportunistic storage data. In some embodiments, an opportunistic storage service may include an indication with data to be stored that indicates to the storage controller that the data is opportunistic storage data. In some embodiments, data received to be stored via a back-end interface may be segregated as opportunistic storage data that is separately stored separate from primary storage data received via a primary interface.

In some embodiments, revocation of an opportunistic storage provision may include revoking a reservation of a portion of a physical storage component, such as physical storage unit (e.g. a die or block), that stores opportunistic storage data such that the portion of the physical storage component (e.g. die or block) becomes available to store primary storage data. For example, in response to a lack of available storage capacity to store primary storage data on physical storage component 182, storage controller 210 may make one or more of physical storage units 232 or 234 available to store primary storage data by revoking an opportunistic storage provision for one or more of the physical storage units 232 and 234. In some embodiments, making the portion of the physical storage component available to store primary data by revoking the opportunistic storage component may include deleting data stored as opportunistic storage data. In some embodiments, revocation of an opportunistic storage provision may include overwriting opportunistic storage data with primary storage data.

Also, in some embodiments, a controller of a physical storage component, such as storage controller 210, may arbitrate allocation of limited resources to ensure that primary storage service level agreements are met. For example, if an overall transaction volume for transactions involving physical storage units of a physical storage component, such as physical storage units 222, 224, 226, 228, 230, 232, 234, and 236 of physical storage component 182 exceeds a threshold transaction volume limit, such as an upper capacity of the physical storage component 182 to process transactions, the storage controller may throttle or block transactions directed to portions of the physical storage component storing opportunistic storage data. For example, storage controller 210 may block or throttle transactions directed to physical storage units 232 or 234 in order to ensure transactions directed to physical storage units 222, 224, and/or 230 are promptly processed within limits included in a service level agreement for primary storage.

In some embodiments, a controller of a physical storage component, such as storage controller 210, may in coordination with an opportunistic storage service track physical locations of the physical storage component that store data as primary storage data, e.g. physical storage units 222, 224, and 230, and may also track portions of the physical storage component that store data as opportunistic storage data, such as physical storage units 232 and 234. In some embodiments, the storage controller may further throttle or block transactions directed to the tracked portions of the physical storage component that store opportunistic storage data to ensure performance guarantees for the primary storage data are met.

In some embodiments, a physical storage component included in a computing device may be a solid-state storage device as described above, or other type of storage device, such as a hard disk drive, other magnetic derive, flash-based memory or other storage device.

In some embodiments, primary storage data and opportunistic storage data may be stored intermixed on a same physical storage unit, such as any of physical storage units 222, 224, 226, 228, 230, 232, 234, or 236. In such embodiments, data segregation may be performed logically by a storage controller, such as storage controller 210, and/or by a storage controller, such as storage controller 210, in coordination with an opportunistic storage service, such as opportunistic storage service 120 or 198 (or any of the opportunistic storage services described herein). For example, a storage controller may prioritize transactions for primary storage data over transactions for opportunistic storage data directed to a same given physical storage unit that stores both primary storage data and opportunistic storage data.

FIG. 3A illustrates portions of an example service level agreement (SLA) that may be associated with a primary storage provision, according to some embodiments.

In some embodiments, different service level agreements may be associated with a primary storage provision, such as may be included with a compute instance, and an opportunistic storage provision, which may provision currently unused storage space on physical storage components of computing devices that provide storage capacity for the primary storage provision. For example, FIG. 3A illustrates a portion of a service level agreement 302 that may apply to a primary storage provision for storing primary storage data. For example, in some embodiments, a primary storage service level agreement may provide a high-level of storage availability for provisioned primary storage capacity. For example, a primary storage SLA may guarantee immediate or near-immediate access to a full amount of provisioned storage capacity, for example the provisioned storage capacity may be available on demand without restriction. In some embodiments, in order to meet this SLA requirement, an opportunistic storage system may revoke opportunistic storage provisions when an amount of remaining currently unused storage space on a physical storage component falls below a threshold limit. In a similar manner, a primary storage SLA may provide a high level of guaranteed transactions per unit of time for primary storage data. For example, primary storage SLA 302 guarantees a transaction rate of 100,000 transactions per second between a physical storage component that provides the primary storage capacity and an associated compute instance that stores data to and retrieves data from the primary storage capacity implemented on the physical storage component.

In some embodiments, in order to achieve a high-level of guaranteed transactions per unit of time, primary storage capacity may be implemented using a physical storage component that is local to a physical compute component that implements an associated compute instance associated with the primary storage capacity. For example, a compute instance may be implemented via a physical compute component included in a same computing device (e.g. same chassis) as a physical storage component used to provide primary storage capacity for the compute instance.

In some embodiments, a primary storage provision may be made for an indefinite amount of time. Also, in some embodiments, a cost associated with a primary storage provision may be greater than a cost associated with an opportunistic storage provision.

However, in some embodiments, costs for primary storage implemented on computing devices of a service provider network that also offers an opportunistic storage service may be lower than costs associated with primary storage implemented on computing devices of a system that does not offer opportunistic storage. For example, in a system that does not offer opportunistic storage, costs of currently unused storage capacity of a physical storage component may not be offset by opportunistically provisioning the currently unused storage capacity. Thus the costs of both used and currently unused primary storage capacity may be fully born by clients to which the primary storage capacity is provisioned without any offset due to usage amounts being below the provisioned primary storage capacity.

FIG. 3B illustrates portions of an example service level agreement (SLA) that may be associated with an opportunistic storage provision, according to some embodiments.

For example, FIG. 3B illustrates a portion of a service level agreement 352 that may apply to an opportunistic storage provision storing opportunistic storage data. In some embodiments, an opportunistic storage service level agreement may provide storage capacity subject to revocation with limited or no-notice. For example, storage availability may not be guaranteed beyond a current point in time. As explained above, opportunistic storage capacity provisioned to a client may be revoked if the storage capacity is needed to satisfy storage demand for a primary storage provision. In some embodiments, opportunistic storage capacity may be provisioned for a capped or limited amount of time, wherein once the capped amount of time has been reached, the opportunistic storage capacity is proactively revoked. Also, a transaction rate for an opportunistic storage provision may not be guaranteed and may be throttled or blocked to ensure a transaction rate guarantee for a primary storage provision is met. However, across a large fleet of computing devices, occurrences of throttling and/or blocking may be rare. For example, opportunistic storage may be provisioned on physical storage components with currently unused storage capacity and currently unused transaction capacity that have a significant margin between a currently used transaction capacity and a capacity limit. Thus, throttling or blocking may only occur if primary storage transaction volume significantly changes, but otherwise may not occur.

In some embodiments, opportunistic storage capacity may be provisioned on physical storage components with current transaction volumes that have only a slight margin between a currently unused transaction capacity and a capacity limit. In such situations, it may be more likely that opportunistic storage capacity transactions may be blocked or throttled. In some embodiments, opportunistic storage capacity provisioned to a client may be revoked to make more transaction capacity available for a primary storage provision.

In some embodiments, opportunistic storage capacity may be provisioned subject to revocation with limited or no-notice. For example, a client may be provided with a notification or other type of indicator indicating that provisioned opportunistic storage capacity will be revoked in a given amount of time. In some embodiments, opportunistic storage capacity may be offered at a discounted costs as compared to primary storage capacity. In some embodiments, revenues from opportunistic storage capacity may offset costs associated with primary storage capacity and thus lower the costs clients pay for use of primary storage capacity. In some embodiments, an opportunistic storage service may allow clients to prioritize an order in which objects are to be lost due to revocation of an opportunistic storage capacity provision.

In some embodiments, a client of an opportunistic storage service may store data on an opportunistic storage capacity pool that is also at least partially redundantly stored on another opportunistic storage capacity pool or other location. Such a storage strategy may protect the client from data loss due to revocation of an opportunistic storage capacity pool. For example, data lost to revocation may be recreated from the at least partially redundant copies of the data stored on the other opportunistic storage capacity pools or other locations. In some embodiments, a service provider network may supplement storage capacity of other services offered by the service provider network with opportunistic storage capacity. For example, a service provider network may offer an additional storage service, such as an object-based storage service, in addition to offering a computing virtualization service with associated primary storage capacity for compute instances of the computing virtualization service or in addition to a block-based storage service that provides block-based storage to the compute instances. The additional storage service may include storage hosts that provide storage for the additional storage service and may also take advantage of currently unused storage capacity on physical storage components that offer primary storage to compute instances to store additional data via an opportunistic storage service.

Figure 4A:
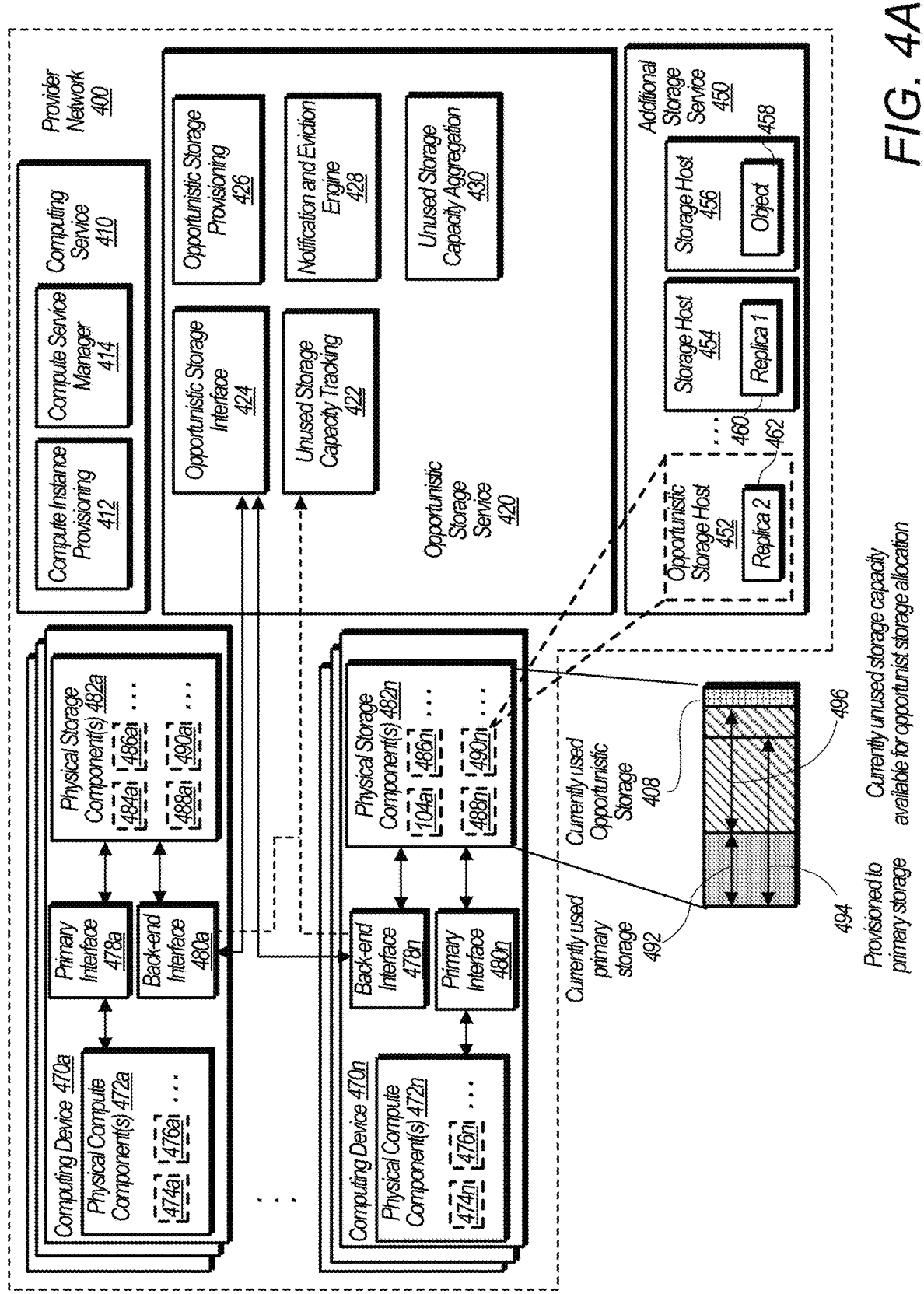
FIG. 4A illustrates a block diagram of a provider network, wherein local storage capacity of a local storage component is made available for use by a local compute instance and an unused portion of the storage capacity of the local storage component is opportunistically provisioned for use by an additional storage service of the provider network, according to some embodiments.

For example, FIG. 4A illustrates a block diagram of a provider network, wherein local storage capacity of a local storage component is made available for use by a local compute instance and an unused portion of the storage capacity of the local storage component is opportunistically provisioned for use by an additional storage service of the provider network, according to some embodiments.

Provider network 400 may be similar to provider network 100 illustrated in FIG. 1. Provider network 400 includes computing service 410, opportunistic storage service 420, additional storage service 450, and computing devices 470a through 470n that implement compute instances 474a, 476a, through 474n, 476n using physical compute components 472a through 472n and that also implement primary storages 484a, 486a through 484n, 486n using physical storage components 482a through 482n. In some embodiments, respective ones of the computing devices 470a-470n include a primary interface 478 and a back-end interface 480 similar to the primary and back-end interfaces described in regard to FIG. 1. In some embodiments, computing service 410 includes a compute instance provisioning element 412 and a compute service manager 414.

In some embodiments, the opportunistic storage service 420 includes opportunistic storage service interface 424, unused storage capacity tracking 422, opportunistic storage provisioning 426, notification and evection engine 428, and unused storage capacity aggregation 430. In some embodiments, the elements of opportunistic storage service 420 may operate in a similar manner as described in regard to opportunistic storage service 120 described in regard to FIG. 1.

In some embodiments, currently unused storage capacity on physical storage components 482a through 482n may be offered as one or more opportunistic storage capacity pools 488a, 490a through 488n, 490n. In some embodiments, opportunistic storage capacity pool 490n may be provisioned to additional storage service 450 as opportunistic storage capacity. For example, opportunistic storage provisioning 426 may advertise opportunistic storage capacity pool 490n as an available amount of opportunistic storage capacity and a manager of additional storage service 450 may request that the opportunistic storage capacity pool 490n be provisioned to the additional storage service 450. As shown in FIG. 4A, the additional storage service 450 may treat the provisioned opportunistic storage capacity of opportunistic storage capacity pool 490n as an additional "opportunistic" or "virtual" storage host and may store replica 2 (462) to the opportunistic storage host 452. Additionally, the additional storage service may at least partially redundantly store the data stored to the opportunistic storage host 452 on one or more other storage hosts (actual or virtual). For example, additional storage service 450 saves object 458 on storage host 456, wherein replica 2 (462) is a replica of object 458. Additionally, additional storage service 450 stores replica 1 (460) on storage host 454.

As shown in FIG. 4A, opportunistic storage data 408 stored to opportunistic storage capacity pool 490n is stored on currently unused storage capacity 496, wherein currently used primary storage 492 is less than provisioned primary storage 494. Thus, at least a portion of the currently unused provisioned primary storage space is re-provisioned a second time as opportunistic storage capacity.

Figure 4B:
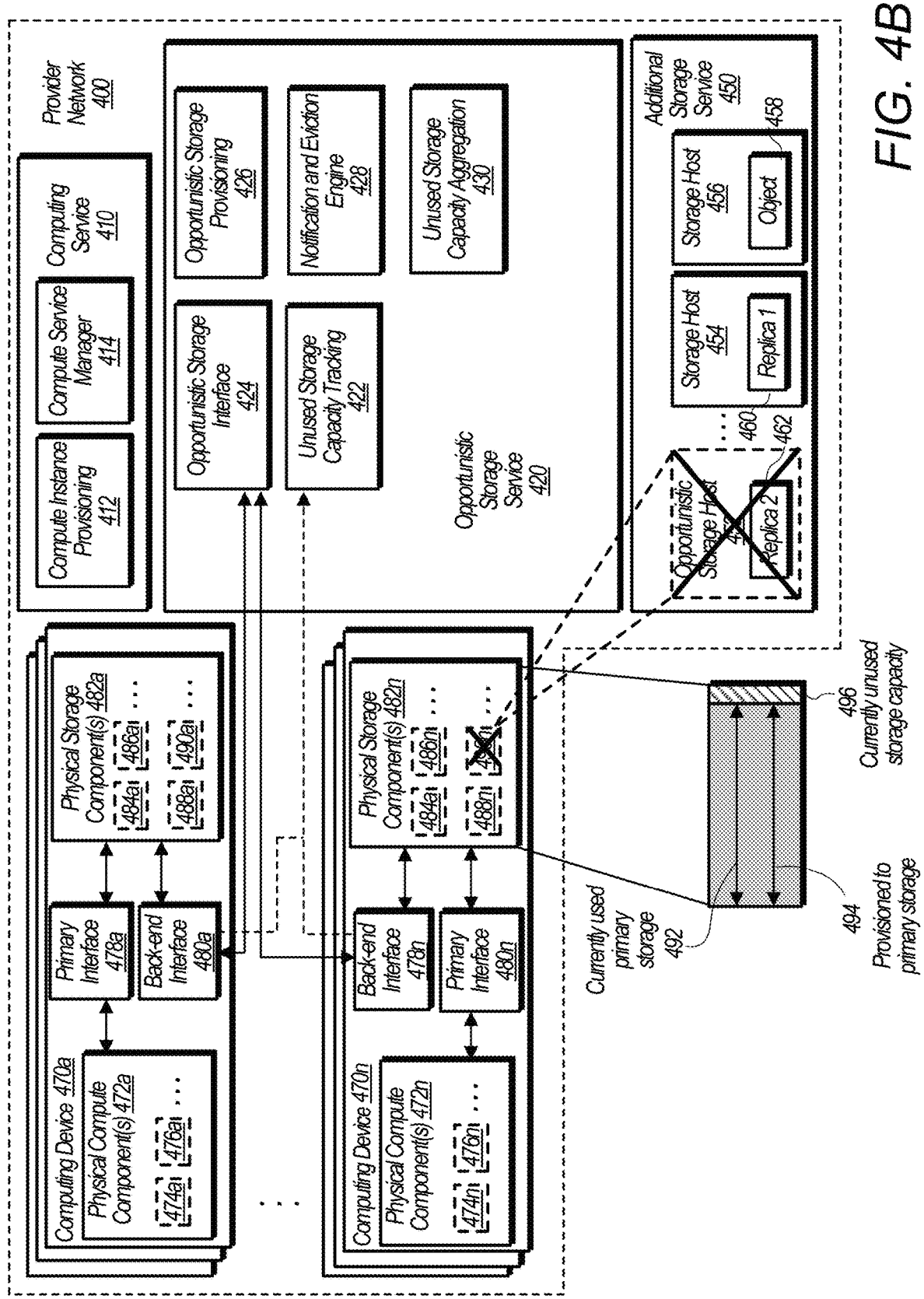
FIG. 4B illustrates a block diagram of a provider network, wherein an opportunistic storage provision provisioned to the additional storage service is revoked due to storage pressure for a primary storage provision, according to some embodiments.

FIG. 4B illustrates a block diagram of a provider network, wherein an opportunistic storage provision provisioned to the additional storage service is revoked due to storage pressure for a primary storage provision, according to some embodiments.

As shown in FIG. 4B, additional data may be stored to a primary storage, such as primary storages 484n or 486n. This may cause the currently used primary storage 492 to represent a greater portion of the provisioned primary storage 494. This may also cause the amount of currently unused storage capacity 496 to be reduced. In some embodiments if the currently unused storage capacity falls below a minimum amount of currently unused storage capacity, one or more opportunistic storage capacity pool provisions may be revoked. For example, a provision for opportunistic storage capacity pool 490n may be revoked. This may cause data stored for replica 2 (462) to be deleted or otherwise made unavailable to additional storage service 450.

Figure 4C:
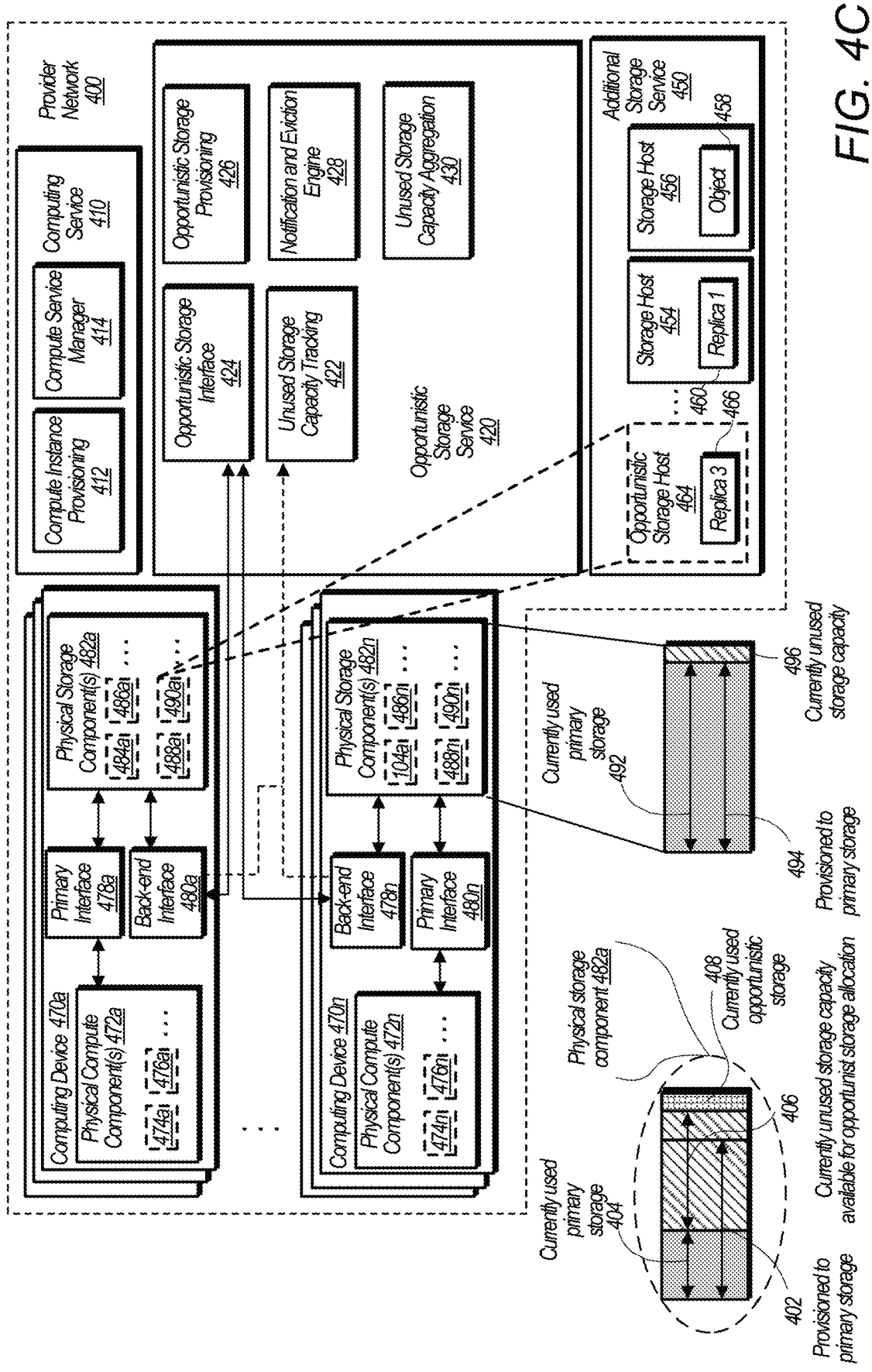
FIG. 4C illustrates a block diagram, wherein data lost due to revocation of an opportunistic storage provision is recreated based on redundantly stored data and is stored to an additional opportunistic storage provision, according to some embodiments.

FIG. 4C illustrates a block diagram, wherein data lost due to revocation of an opportunistic storage provision is recreated based on redundantly stored data and is stored to an additional opportunistic storage provision, according to some embodiments.

In response to opportunistic storage capacity pool provision 490n being revoked, additional storage service 450 may provision an additional opportunistic storage capacity pool on another physical storage component of one of the computing devices of service provider network 400. For example, as shown in FIG. 4C, additional storage service 450 may provision opportunistic storage capacity pool 490a on physical storage component 482a of computing device 470a. As shown in the inset illustrated in FIG. 4C, physical storage component 482a may have sufficient currently unused storage capacity 406 to store opportunistic storage data 408. In some embodiments, the opportunistic storage data 408 may be stored using "currently unused" capacity 406 of provisioned primary storage capacity 402, wherein an amount of storage capacity used to store primary storage data 404 is less than the provisioned primary storage capacity 402. In some embodiments, the additional storage service 450 may request another opportunistic storage capacity pool be provisioned via opportunistic storage provisioning 426 of opportunistic storage service 420.

Because a client of an opportunistic storage service, such as additional storage service 450, may at least partially redundantly store data stored to an opportunistic storage capacity pool, the client may recreate data lost to revocation. For example, additional storage service 450 may recreate a new replica 3 (466) of object 458 using data stored to storage hosts 454 and 456. The additional storage service 450 may also implement an additional opportunistic storage host 464 using opportunistic storage capacity pool 490a to replace opportunistic storage host 452 that was lost due to revocation of opportunistic storage capacity pool 490n.

Note that the nomenclature "a" through "n" has been used in FIGS. 1 and 4 to indicate a variable number of components and should not be interpreted as limiting the disclosure to any particular number of components. For example, in some embodiments a computing device may include any number of physical compute components and physical storage components. Also, a provider network may include any number of computing devices. Additionally, a physical compute component of a computing device may be used to implement any number of compute instances and a physical storage component of the computing device may be used to implement any number of corresponding primary storages for the compute instances. Also, any number of opportunistic storage capacity pools may be implemented using currently unused storage capacity of a physical storage component of a computing device.

Figure 5:
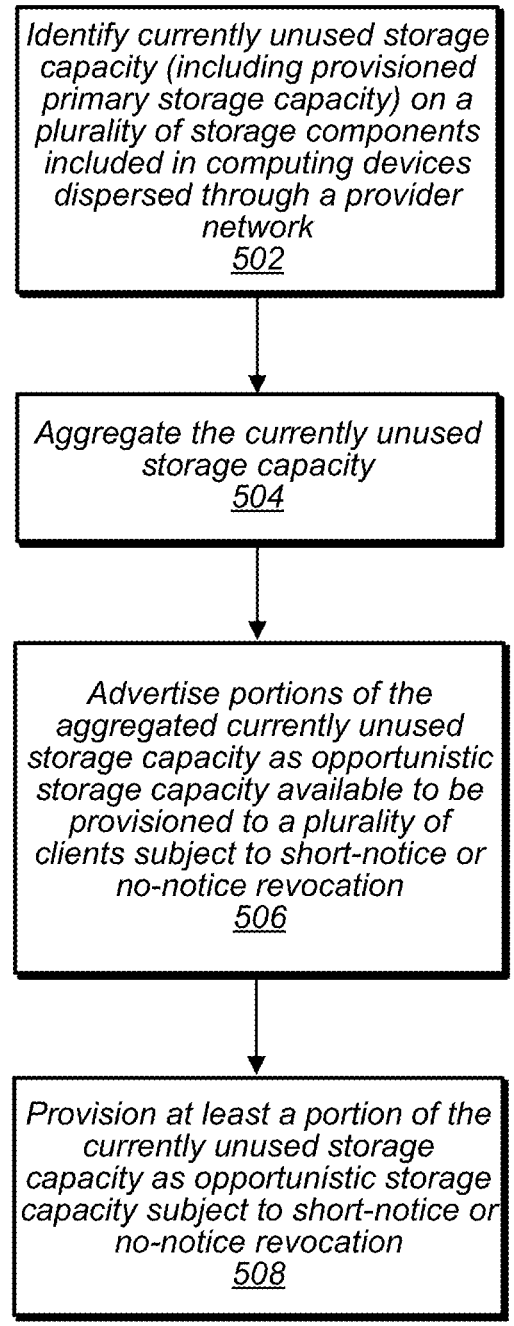
FIG. 5 is a high-level flowchart illustrating various methods and techniques for providing opportunistic storage, according to some embodiments.

FIG. 5 is a high-level flowchart illustrating various methods and techniques for providing opportunistic storage, according to some embodiments.

At 502, an opportunistic storage service identifies currently unused storage capacity, including provisioned primary storage capacity, on a plurality of physical storage components included in computing devices of a provider network. In some embodiments, the computing devices with currently unused storage capacity may be dispersed throughout a service provider network. For example, computing devices that include physical storage components with currently unused storage capacity may be located in different server chassis, different server racks, different data center halls, or different data centers of a provider network.

At 504, the opportunistic storage service aggregates the identified currently unused storage capacity on the physical storage components of the computing devices of the provider network into one or more lists of storage capacity available to be provisioned as opportunistic storage capacity. In some embodiments, aggregation may be omitted.

At 506, the opportunistic storage service advertises at least a portion of the aggregated list of currently unused storage capacity as storage capacity available to be provisioned to clients as opportunistic storage capacity. In some embodiments, the opportunistic storage capacity may be advertised as isolated pools of opportunistic storage capacity on separate physical storage components, or may be advertised as one or more pools of opportunistic storage capacity on multiple physical storage components. In some embodiments, as described in more detail in regard to FIGS. 7A-7B, an opportunistic storage service may advertise a virtualized storage resource implemented using opportunistic storage capacity, wherein the opportunistic storage service manages selecting the pools of opportunistic storage capacity used to implement the virtualized storage resource. In some embodiments, an opportunistic storage service may also manage relocating data stored to a virtualized storage resource in response to one or more opportunistic storage capacity pools being revoked.

At 508, in response to a client requesting an advertised opportunistic storage pool or virtualized storage resource be provisioned for the client, the opportunistic storage service provisions at least a portion of the currently unused storage capacity to the client (or a virtualized storage resource provisioned to the client) as opportunistic storage. In some embodiments, the opportunistic storage service may maintain a directory of which bytes on which physical storage components are provisioned to which clients. Additionally, or alternatively, an opportunistic storage service may maintain a directory of which portions of physical storage components, such as dies (or blocks) of an SSD, are used to store opportunistic storage data. In some embodiments, when an opportunistic storage capacity pool is revoked, the opportunistic storage service may automatically update the directory. Also, in embodiments, wherein the opportunistic storage service manages data relocation for clients in anticipation of opportunistic storage capacity pool revocation, the opportunistic storage service may update the directory to indicate a current storage location for relocated opportunistic storage data.

Figure 6:
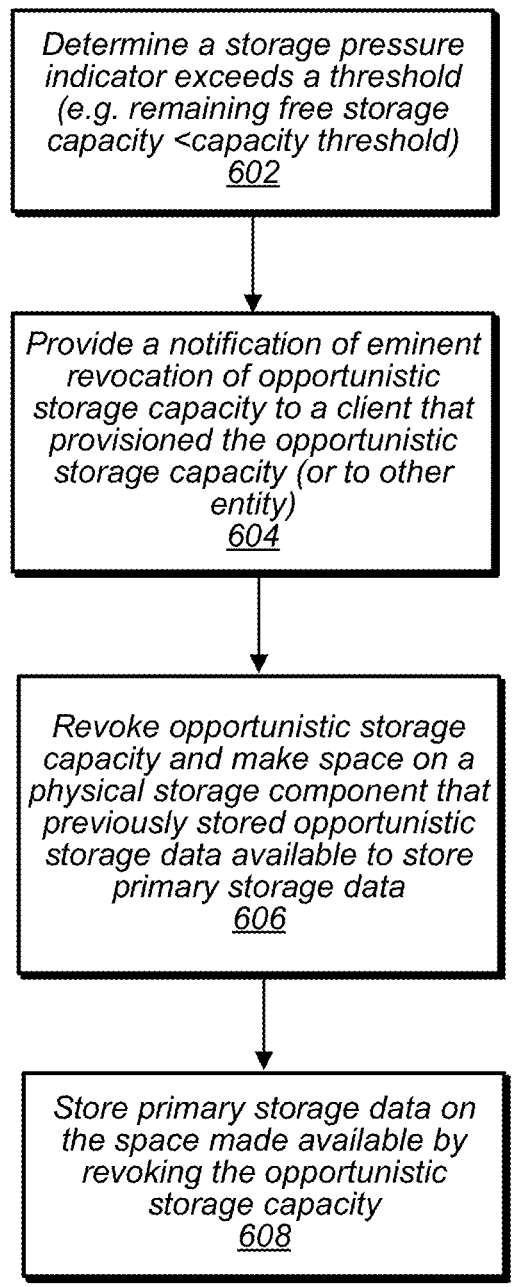
FIG. 6 is a high-level flowchart illustrating various methods and techniques for monitoring and revoking opportunistic storage, according to some embodiments.

FIG. 6 is a high-level flowchart illustrating various methods and techniques for monitoring and revoking opportunistic storage, according to some embodiments.

At 602, an opportunistic storage service determines a storage pressure indicator for a physical storage component of a computing device, or set of physical storage components of one or more computing devices, exceeds or falls below a threshold. In some embodiments, a storage pressure indicator may include an amount of storage capacity remaining available to store data for a primary storage provision or multiple primary storage provisions. In some embodiments, a storage pressure indicator may include an amount of transaction capacity on a physical storage component remaining available to perform transactions for a primary storage provision. In some embodiments, a storage pressure indicator may include one or more other measures of storage capacity or performance and may be compared to a corresponding threshold that ensures service level guarantees for one or more primary storage provisions are met.

At 604, in response to determining the storage pressure indicator exceeds the threshold, the opportunistic storage service may provide a notification to a client for whom an opportunistic storage capacity provision is to be revoked. In some embodiments, the notification may be sent to another entity that is delegated authority to receive notifications for the client. In some embodiments, the notification may provide a "time-to-live" prediction indicating an amount of time before the opportunistic storage provision is revoked. In some embodiments, a client may, in response to a revocation notice, provide an ordered list of opportunistic storage provisions, wherein the opportunistic storage service revokes the opportunistic storage provisions as necessary according to the ordered list. In some embodiments, a client may provide an ordered list of opportunistic storage provisions prior to being notified of an imminent revocation.

At 606, the opportunistic storage service revokes one or more opportunistic storage provisions to make space on a physical storage component to store additional data for a primary storage provision.

At 608, a compute instance stores primary storage data on the space on the physical storage component made available due to the revocation of one or more opportunistic storage provisions.

Figure 7A:
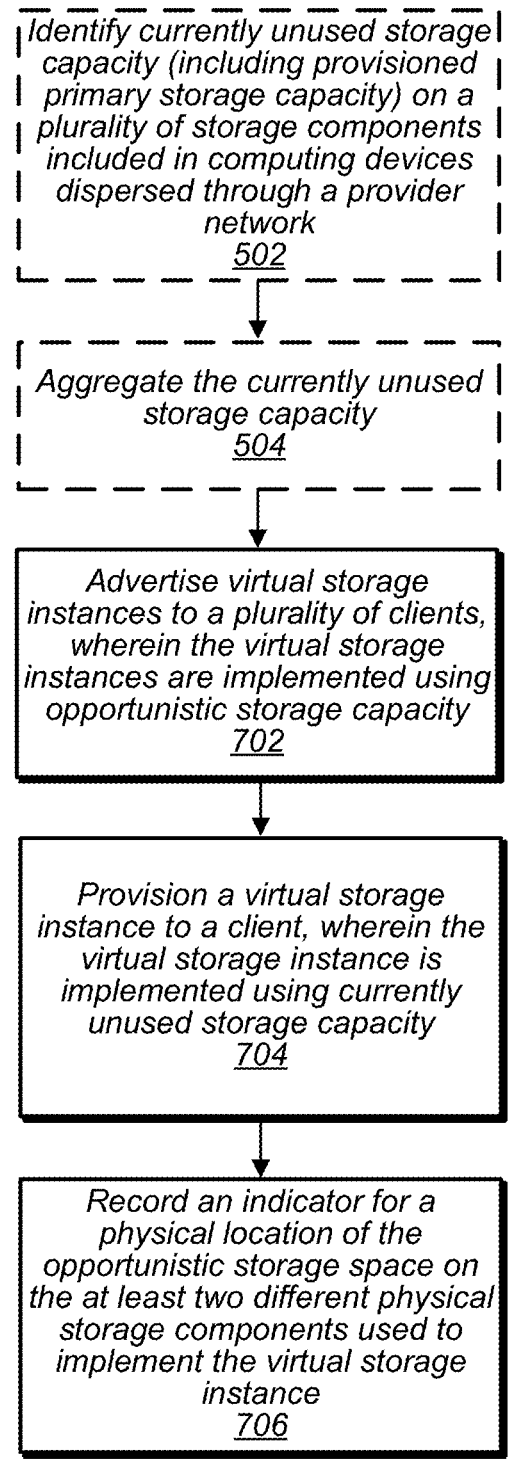
FIG. 7A is a high-level flowchart illustrating various methods and techniques for providing opportunistic storage as a virtualized storage resource, according to some embodiments.

FIG. 7A is a high-level flowchart illustrating various methods and techniques for providing opportunistic storage as a virtualized storage resource, according to some embodiments.

As discussed above at 502 and 504, an opportunistic storage service may identify currently unused storage capacity on physical storage components and aggregate the currently unused storage capacity into an aggregated list of currently unused storage capacity.

In embodiments, that offer virtualized storage resources, at 702, the opportunistic storage service (or another service of a service provider network) may advertise virtual storage resources, such as virtual storage instances to a plurality of clients of the service provider network, wherein the virtual storage instances are implemented using opportunistic storage capacity.

At 704, the opportunistic storage service (or another service of the provider network) provisions a virtual storage instance to a client of the provider network, wherein the virtual storage instance is implemented using opportunistic storage capacity. In some embodiments, the virtual storage instance is implemented using opportunistic storage capacity on at least two different storage components included in different computing devices of a provider network. In some embodiments, an opportunistic storage interface of the opportunistic storage service is connected over a provider network to the different computing devices that include the physical storage components and is configured to accept data access and modification requests directed to the virtual storage instance. The opportunistic storage interface is further configured to cause the data access and modification requests to be routed to physical storage components that store data for the virtual storage instance on opportunistic storage capacity, wherein the data access and modification requests are routed to the physical storage components comprising the opportunistic storage capacity via one or more back-end interfaces.

At 706, an opportunistic storage service records an indicator for a physical location corresponding to an opportunistic storage space on a physical storage component where data is stored for the virtual storage instance on opportunistic storage space on at least two different physical storage components of one or more computing devices of a provider network.

Figure 7B:
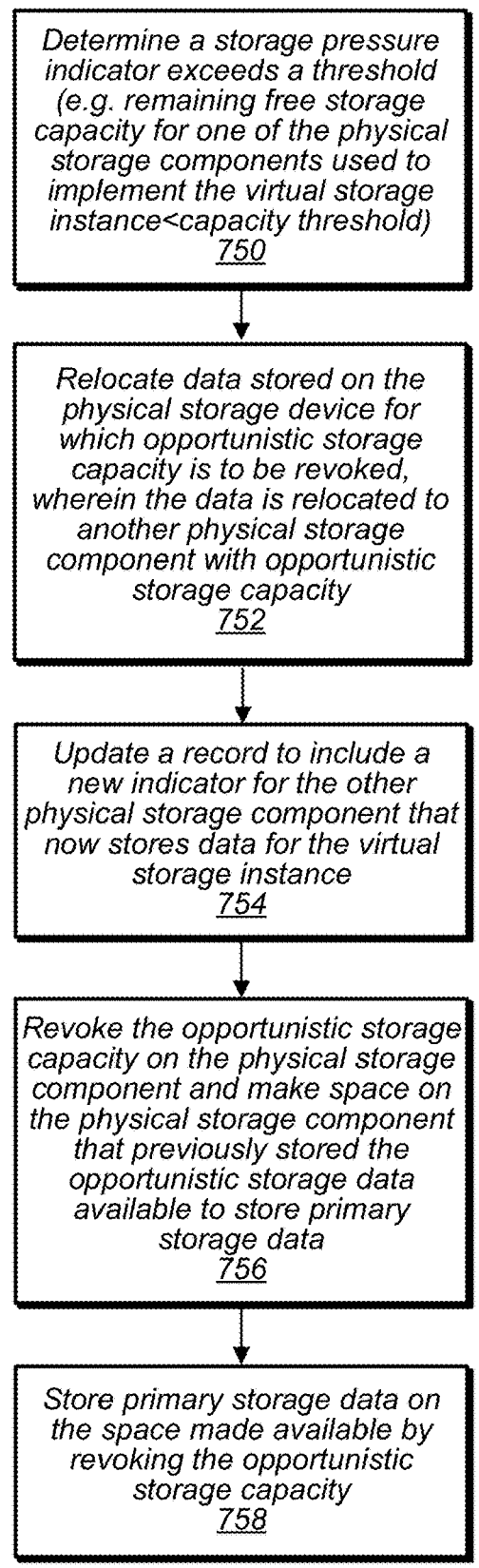
FIG. 7B is a high-level flowchart illustrating various methods and techniques for managing a virtualized storage resource implemented using opportunistic storage, according to some embodiments.

FIG. 7B is a high-level flowchart illustrating various methods and techniques for managing a virtualized storage resource implemented using opportunistic storage, according to some embodiments.

At 750, an opportunistic storage service determines whether a storage pressure indicator for opportunistic storage used to implement a virtual storage instance exceeds or falls below a threshold value. For example, an amount of remaining storage space on a physical storage component used to implement a virtual storage instance using opportunistic storage capacity may fall below a minimum threshold for free storage space capacity.

At 752, an opportunistic storage service may relocate data stored on a particular physical storage component experiencing high storage pressure to opportunistic storage space on another physical storage component that is experiencing less storage pressure.

At 754, the opportunistic storage service may update a record of physical storage components used to implement the virtual storage instance to include a new indicator for the opportunistic storage capacity on the other physical storage component to which the data was relocated.

At 756, the opportunistic storage service may revoke the opportunistic storage capacity on the particular physical storage component after the data has been relocated from the particular physical storage component. Additionally, the opportunistic storage service may make space available on the particular physical storage component to store data for a primary storage provision subsequent to revoking the opportunistic storage capacity provision.

At 758, a compute instance or other entity with a primary storage provision may store primary storage data on the space made available due to revoking the opportunistic storage capacity provision.

Figure 8:
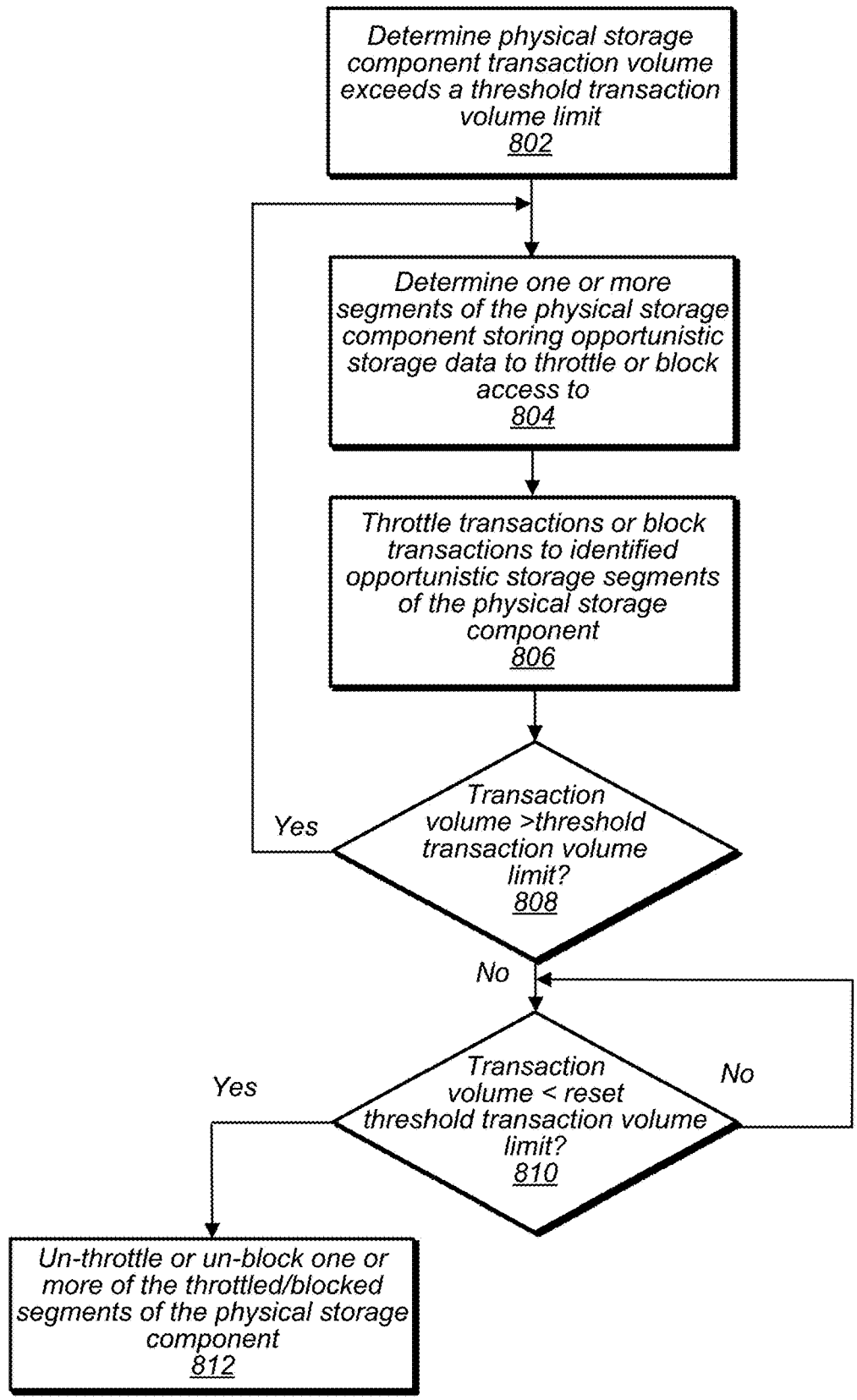
FIG. 8 is a high-level flowchart illustrating various methods and techniques for managing transactions for opportunistic storage, according to some embodiments.

FIG. 8 is a high-level flowchart illustrating various methods and techniques for managing transactions for opportunistic storage, according to some embodiments.

At 802, it is determined whether a transaction volume for a physical storage component exceeds a threshold transaction volume limit.

At 804, a storage controller of a physical storage component, or a storage controller of a physical storage controller in coordination with an opportunistic storage service, determines one or more segments, such as dies (or blocks) of an SSD, of the physical storage component that store opportunistic storage data.

At 806, the storage controller throttles or blocks transactions to the determined one or more segments of the physical storage component that store opportunistic storage data. Throttling or blocking transactions to the determined one or more segments of the physical storage component may free up transaction capacity such that it is available to perform transactions for one or more other segments of the physical storage component that store primary storage data.

At 808, it is determined whether the transaction volume for the physical storage component is reduced to below the threshold transaction volume limit. If not, the process reverts to 804 and additional segments of the physical storage component storing opportunistic storage data are selected to be throttled or blocked. If the transaction volume is reduced to below the threshold transaction volume limit, at 810, it is determined whether the transaction volume has been reduced to below a reset limit, which may be a lower limit than the transaction volume limit. If the transaction volume has not been reduced to below the reset limit the storage controller may continue to block or throttle transactions for the selected segments of the physical storage component that store opportunistic storage data. If the transaction volume has been reduced to below the reset limit, at 812, the storage controller may un-throttle or unblock one or more of the throttled or blocked segments of the physical storage component.

Figure 9:
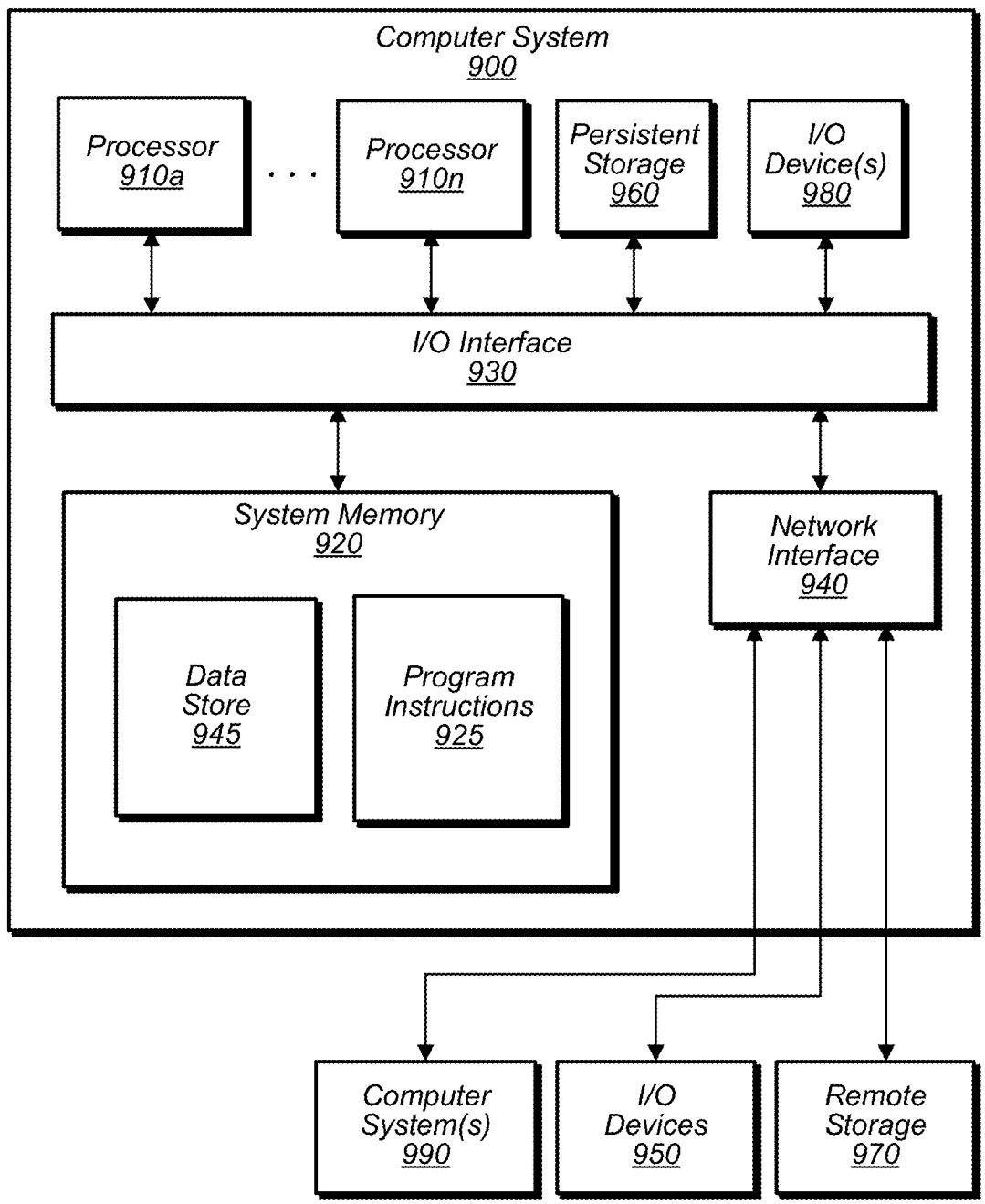
FIG. 9 is a block diagram illustrating an example computing system, according to some embodiments.

FIG. 9 is a block diagram illustrating an example computing system, according to some embodiments. For example, computer system 900 may be configured to implement a computing service, an opportunistic storage service, an additional storage service, other network-based services, computing devices that implement a computing service and/or storage service, and/or a client, in different embodiments. Computer system 900 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 900 includes one or more processors 910 (any of which may include multiple cores, which may be single or multi-threaded) coupled to a system memory 920 via an input/output (I/O) interface 930. Computer system 900 further includes a network interface 940 coupled to I/O interface 930. In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA. The computer system 900 also includes one or more network communication devices (e.g., network interface 940) for communicating with other systems and/or components over a communications network (e.g. Internet, LAN, etc.).

In the illustrated embodiment, computer system 900 also includes one or more persistent storage devices 960 and/or one or more I/O devices 980. In various embodiments, persistent storage devices 960 may correspond to disk drives, tape drives, solid state memory, other mass storage devices, block-based storage devices, or any other persistent storage device. Computer system 900 (or a distributed application or operating system operating thereon) may store instructions and/or data in persistent storage devices 960, as desired, and may retrieve the stored instruction and/or data as needed. For example, in some embodiments, computer system 900 may host a storage system server node, and persistent storage 960 may include the SSDs attached to that server node.

Computer system 900 includes one or more system memories 920 that are configured to store instructions and data accessible by processor(s) 910. In various embodiments, system memories 920 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 920 may contain program instructions 925 that are executable by processor(s) 910 to implement the methods and techniques described herein. In various embodiments, program instructions 925 may be encoded in platform native binary, any interpreted language such as Java™ byte-code, or in any other language such as C/C++, Java™, etc., or in any combination thereof. For example, in the illustrated embodiment, program instructions 925 include program instructions executable to implement the functionality of a computing device as described herein, in different embodiments. In some embodiments, program instructions 925 may implement multiple separate clients, nodes, and/or other components.

In some embodiments, program instructions 925 may include instructions executable to implement an operating system (not shown), which may be any of various operating systems, such as UNIX, LINUX, Solaris™, MacOS™, Windows™, etc. Any or all of program instructions 925 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 900 via I/O interface 930. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 940.

In some embodiments, system memory 920 may include data store 945, which may be configured as described herein. In general, system memory 920 (e.g., data store 945 within system memory 920), persistent storage 960, and/or remote storage 970 may store data blocks, replicas of data blocks, metadata associated with data blocks and/or their state, configuration information, and/or any other information usable in implementing the methods and techniques described herein.

In one embodiment, I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other devices attached to a network, such as other computer systems 990, for example. In addition, network interface 940 may be configured to allow communication between computer system 900 and various I/O devices 950 and/or remote storage 970. Input/output devices 950 may, in some embodiments, include one or more display terminals, keyboards, keypads, touchpads, scanning devices, voice or optical recognition devices, or any other devices suitable for entering or retrieving data by one or more computer systems 900. Multiple input/output devices 950 may be present in computer system 900 or may be distributed on various nodes of a distributed system that includes computer system 900. In some embodiments, similar input/output devices may be separate from computer system 900 and may interact with one or more nodes of a distributed system that includes computer system 900 through a wired or wireless connection, such as over network interface 940. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol. In various embodiments, computer system 900 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A service provider network, comprising:
a plurality of servers, each comprising a physical compute component and a physical storage component;
a computing service implemented via the servers, wherein the computing service is configured to:
provision compute instances to clients of the service provider network, wherein for respective ones of the compute instances, a physical compute component that implements the compute instance is included in a same server as respective physical storage components that provide provisioned primary storage capacity for the compute instance; and
a storage service implemented via the servers, wherein the storage service is configured to:
identify currently unused provisioned primary storage capacity on the physical storage components, wherein, for respective ones of the compute instances, a portion of the provisioned primary storage capacity for the compute instance is being used to store data for the compute instance and an unused portion of the provisioned primary storage capacity for the compute instance is currently not being used to store data for the compute instance;
advertise the currently unused provisioned primary storage capacity as opportunistic storage capacity available to be provisioned to another client of the service provider network; and
provision, to the other client of the service provider network, as opportunistic storage capacity, at least a portion of the currently unused provisioned primary storage capacity, wherein the opportunistic storage capacity is provisioned to the other client subject to revocation upon an additional portion of the provisioned primary storage capacity being required to store data for a respective one of the compute instances to which the primary storage capacity is also provisioned; and
resolve conflicting demands on the respective physical storage components, that conflict between the provisioned primary storage capacity and the provisioned opportunistic storage capacity, such that the conflicting demands are resolved in favor of the provisioned primary storage capacity.

2. The service provider network of claim 1, wherein the storage service is further configured to:
aggregate the currently unused provisioned primary storage capacity on the physical storage components and un-provisioned storage capacity on the physical storage components; and
advertise the aggregated storage capacity as opportunistic storage capacity available to be provisioned to a plurality of other clients of the service provider network.

3. The service provider network of claim 1, wherein, for respective ones of the servers, the physical storage component included in the server is a solid-state storage device local to the physical compute component of the server, and
wherein the solid-state storage device comprises a storage controller that, in coordination with the storage service, tracks physical locations of the solid-state storage device where data is stored as primary storage data and physical locations of the solid-state storage device where data is stored as opportunistic storage data.

4. The service provider network of claim 1, wherein the service provider network further comprises:
an additional storage service implemented via storage servers, wherein the provisioned opportunistic storage capacity is provisioned to the additional storage service, wherein the additional storage service is provisioned opportunistic storage capacity on a plurality of physical storage components of the servers of the service provider network, and
wherein the additional storage service is configured to store data, at least partially redundantly, on two or more of the plurality of physical storage components such that if the opportunistic storage capacity of a given one of the two or more physical storage components is revoked, data lost due to the revocation can be recovered from the at least partially redundant data stored on another one of the two or more physical storage components.

5. A system, comprising:
one or more computing devices configured to implement a storage service configured to:
identify currently unused provisioned primary storage capacity on physical storage components included in computing devices of a provider network, wherein respective ones of the one computing devices of the provider network comprise a physical storage component and a physical compute component;
advertise the currently unused provisioned primary storage capacity on the physical storage components as opportunistic storage capacity;
provision at least a portion of the currently unused provisioned primary storage capacity on the physical storage components as opportunistic storage capacity, wherein the opportunistic storage capacity is provisioned subject to revocation based on an additional portion of a physical storage component being used to store data for a particular compute instance to which primary storage capacity is also provisioned, wherein the particular compute instance is implemented via one of the physical compute components of the computing devices of the provider network; and
resolve conflicting demands on the respective physical storage components, that conflict between the provisioned primary storage capacity and the provisioned opportunistic storage capacity, such that the conflicting demands are resolved in favor of the provisioned primary storage capacity.

6. The system of claim 5, wherein for the particular compute instance, a physical compute component that implements the particular compute instance is included in a same computing device as one or more physical storage components that provide provisioned primary storage capacity for the particular compute instance.

7. The system of claim 5, wherein to provision the opportunistic storage capacity, the storage service is configured to:
provision a virtual storage instance implemented via opportunistic storage capacity of two or more physical storage components in respective ones of the computing devices of the provider network.

8. The system of claim 5, wherein to provision the opportunistic storage capacity, the storage service is configured to:
provision, to a given client, opportunistic storage capacity of a first physical storage component in a respective one of the computing devices of the provider network as a first amount of opportunistic storage capacity and provision, to the given client, opportunistic storage capacity of a second physical storage component in another respective one of the computing devices of the provider network as a second amount of opportunistic storage capacity.

9. The system of claim 5, wherein the storage service is further configured to:
   determine an amount of currently unused primary storage capacity on the physical storage component is less than a threshold amount of unused primary storage capacity; and
   revoke at least a portion of the provisioned opportunistic storage capacity such that the amount of currently unused primary storage capacity is increased to more than the threshold amount of unused primary storage capacity.

10. The system of claim 9, wherein the provisioned opportunistic storage capacity is provisioned for a fixed amount of time subject to revocation, wherein the storage service is further configured to:
    revoke at least a portion of the provisioned opportunistic storage capacity at an end of the fixed amount of time even if the currently unused primary storage capacity on the physical storage component is greater than the threshold amount of unused primary storage capacity.

11. The system of claim 9, wherein the storage service is further configured to:
    provide a notification that the at least a portion of the provisioned opportunistic capacity is to be revoked, based on determining the currently unused primary storage capacity is less than the threshold amount of unused primary storage capacity.

12. The system, of claim 9, wherein the system further comprises a computing service configured to:
    provision compute instances, wherein for respective ones of the compute instances, a physical compute component that implements the compute instance is included in a same computing device as a physical storage component that provides provisioned primary storage capacity for the compute instance;
    wherein the computing service is further configured to:
    store, using primary storage capacity made available due to the revocation of the at least a portion of the opportunistic storage capacity, additional data on the physical storage component for a computing instance to which provisioned primary storage capacity on the physical storage component is provisioned.

13. The system of claim 12,
    wherein the primary storage capacity, provisioned in relation to the compute instance, is provisioned in accordance with a first service level agreement (SLA),
    wherein the opportunistic storage capacity is provisioned in accordance with a second service level agreement (SLA),
    wherein the first SLA guarantees a greater level of availability to store data than the second SLA.

14. The system of claim 13, wherein the first SLA guarantees an ability to perform at least a threshold number of transactions per second between the primary storage capacity and the compute instance, wherein the second SLA comprises an eventual completion guarantee for transactions, and wherein transactions associated with the opportunistic storage capacity are opportunistically performed subordinate to the guaranteed threshold number of transactions per second between the primary storage capacity and the compute instance.

15. The system of claim 13, wherein the second SLA provides opportunistic transaction capacity for the opportunistic storage capacity, wherein the opportunistic transaction capacity is subject to throttling, blocking, or bring revoked, based on a transaction volume associated with the primary storage capacity provisioned in relation to the compute instance exceeding a threshold transaction volume.

16. The system of claim 15, wherein:
    the one or more physical storage components are solid-state storage devices comprising a storage controller that tracks, in coordination with the storage service, physical locations on the solid-state storage devices where data is stored for primary storage capacity related to the compute instance and where data is stored for opportunistic storage capacity; and
    to throttle or block the opportunistic transaction capacity, the storage service is configured to cause the storage controller to throttle or block transactions directed to portions of the solid-state storage devices that store data for the opportunistic storage capacity.

17. A method, comprising:
    provisioning primary storage capacity to a first client on a physical storage component included in a computing device that includes a physical compute component that implements a compute instance provisioned to the first client;
    advertising, via an opportunistic storage service interface, currently unused provisioned primary storage capacity on the physical storage components as opportunistic storage capacity available to be provisioned to other clients;
    provisioning, to a given one of the other clients, at least a portion of the currently unused provisioned primary storage capacity on the physical storage component as opportunistic storage capacity, wherein the opportunistic storage capacity is provisioned subject to revocation based on a greater portion of the physical storage component being used for primary storage provisioned to the first client; and
    resolving conflicting demands on the physical storage components, that conflict between the provisioned primary storage capacity and the provisioned opportunistic storage capacity, such that the conflicting demands are resolved in favor of the provisioned primary storage capacity.

18. The method of claim 17, wherein resolving the conflicting demands comprises:
    revoking at least a portion of the opportunistic storage capacity provisioned to the given client such that an amount of currently unused primary storage capacity available to store data for the first client is increased.

19. The method of claim 18, further comprising:
    providing a notification to the given client that the at least a portion of the opportunistic storage provisioned to the given client is to be revoked.

20. The method of claim 18, further comprising:
    relocating data of the given client from the at least a portion of the opportunistic capacity on the physical storage component to currently unused primary storage capacity on another physical storage component of a provider network.

21. The method of claim 20, further comprising:
    storing data for the first client on primary storage capacity space on the physical storage component made available by relocating the data of the given client to the currently unused primary storage capacity on the other physical storage component of the provider network.

22. The method of claim 17, wherein said advertising the currently unused provisioned primary storage capacity on the physical storage components as opportunistic storage capacity available to be provisioned comprises:
- indicating to the other clients a particular level of a plurality of possible levels of aggregated opportunistic storage capacity availability for the opportunistic storage service, wherein respective ones of the plurality of levels of aggregated opportunistic storage capacity availability correspond to respective probabilities of opportunistic storage capacity provisioned to the other clients being revoked.

* * * * *